(12) United States Patent
Amano et al.

(10) Patent No.: US 8,099,547 B2
(45) Date of Patent: Jan. 17, 2012

(54) LOAD SHARING METHOD AND SYSTEM FOR COMPUTER SYSTEM

(75) Inventors: Takashi Amano, Yokohama (JP); Kenta Shiga, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 443 days.

(21) Appl. No.: 12/314,297

(22) Filed: Dec. 8, 2008

(65) Prior Publication Data
US 2010/0082897 A1 Apr. 1, 2010

(30) Foreign Application Priority Data
Sep. 26, 2008 (JP) ................................ 2008-247543

(51) Int. Cl.
*G06F 12/02* (2006.01)

(52) U.S. Cl. ................. 711/112; 711/154; 711/E12.002

(58) Field of Classification Search .................. 711/112, 711/154, E12.002
See application file for complete search history.

(56) References Cited

U.S. PATENT DOCUMENTS
2004/0210724 A1 10/2004 Koning et al.
2008/0077737 A1* 3/2008 Nakase et al. ................ 711/114
* cited by examiner

*Primary Examiner* — Jasmine Song
(74) *Attorney, Agent, or Firm* — Stites & Harbison PLLC; Juan Carlos A. Marquez, Esq.

(57) ABSTRACT

The invention is directed to a load sharing method in a computer system including a first storage subsystem, a host computer, and a management computer. In the computer system, the first storage subsystem creates a plurality of first logical units from a storage area of a disk drive group, and the host computer creates a logical storage area configured by a plurality of virtual logical units respectively corresponding to the first logical units. A communications path is set between the host computer and each of the first logical units configuring the logical storage area. The load sharing method includes the steps of: monitoring, by the first storage subsystem, a load of its own; and changing, by the first storage subsystem, the communications paths between the host computer and the first logical units based on the monitoring result of the load. With such a configuration, provided is a computer system high in extensibility not deteriorating the performance at the limit of the system after load sharing among the storage subsystems.

6 Claims, 27 Drawing Sheets

FIG. 2

| STORAGE SUBSYSTEM ID | NOT-IN-USE CAPACITY | MANAGEMENT I/F |
|---|---|---|
| storage0 | 5000GB | 192.168.1.1 |

| RAID GROUP ID | INTERNAL LUN | TARGET NAME | IP ADDRESS | PORT NUMBER | EXTERNAL LUN | LVM-LU ID |
|---|---|---|---|---|---|---|
| 0 | 0 | LVM-0-000 | 192.168.0.1 | 50000 | 0 | LVM-0 |
| 0 | 1 | LVM-0-001 | 192.168.0.1 | 50001 | 0 | LVM-0 |
| 0 | 2 | LVM-0-002 | 192.168.0.1 | 50002 | 0 | LVM-0 |
| 0 | 3 | LVM-0-003 | 192.168.0.1 | 50003 | 0 | LVM-0 |
| 1 | 4 | LVM-1-000 | 192.168.0.2 | 60000 | 0 | LVM-1 |
| 1 | 5 | LVM-1-001 | 192.168.0.2 | 60001 | 0 | LVM-1 |
| 1 | 6 | LVM-1-002 | 192.168.0.2 | 60002 | 0 | LVM-1 |

| RAID GROUP ID 300 | INTERNAL LUN 301 | IP ADDRESS 303 | HOST I/F-USED BAND 400 |
|---|---|---|---|
| 0 | 0 | 192.168.0.1 | 70 Mbps |
| 0 | 1 | 192.168.0.1 | 80 Mbps |
| 0 | 2 | 192.168.0.1 | 90 Mbps |
| 0 | 3 | 192.168.0.1 | 100 Mbps |
| 1 | 4 | 192.168.0.2 | 30 Mbps |
| 1 | 5 | 192.168.0.2 | 40 Mbps |
| 1 | 6 | 192.168.0.2 | 50 Mbps |

FIG. 6

| LVM-LUN 600 | TARGET NAME 302 | IP ADDRESS 303 | PORT NUMBER 304 | EXTERNAL LUN 305 |
|---|---|---|---|---|
| 0 | LVM-0-000 | 192.168.0.1 | 50000 | 0 |
| 0 | LVM-0-001 | 192.168.0.1 | 50001 | 0 |
| 0 | LVM-0-002 | 192.168.0.1 | 50002 | 0 |
| 0 | LVM-0-003 | 192.168.0.1 | 50003 | 0 |

| SYSTEM GROUP ID | STORAGE SUBSYSTEM ID | MANAGEMENT I/F |
|---|---|---|
| System0 | Storage0 | 192.168.1.1 |

| Byte | Offset(0) | Offset(1) | Offset(2) | Offset(3) |
|---|---|---|---|---|
| ... | | | | |
| 4 to 7 | 0 | | | |
| ... | | | | |
| 36 to 39 | 50(AsycEvent) | | | |
| | | | DataSegmentLength | |
| 52 to n | DataSegment(Sense Data or iSCSI Event Data) | | | |
| ... | | | | |

| RAID GROUP ID | INTERNAL LUN | TARGET NAME | IP ADDRESS | PORT NUMBER | EXTERNAL LUN | LVM-LU ID |
|---|---|---|---|---|---|---|
| 0 | 0 | LVM-0-000 | 192.168.0.1 | 50000 | 0 | LVM-0 |
| 0 | 1 | LVM-0-001 | 192.168.0.1 | 50001 | 0 | LVM-0 |
| 0 | 2 | LVM-0-002 | 192.168.0.1 | 50002 | 0 | LVM-0 |
| 0 | 3 | LVM-0-003 | 192.168.0.2 | 60000 | 0 | LVM-0 |
| 1 | 4 | LVM-1-000 | 192.168.0.2 | 60001 | 0 | LVM-1 |
| 1 | 5 | LVM-1-001 | 192.168.0.2 | 60002 | 0 | LVM-1 |
| 1 | 6 | LVM-1-002 | | | | LVM-1 |

| RAID GROUP ID 300 | INTERNAL LUN 301 | IOPS 1800 |
|---|---|---|
| 0 | 0 | 80 KIOPS |
| 0 | 1 | 100 KIOPS |
| 0 | 2 | 150 KIOPS |
| 1 | 4 | 50 KIOPS |
| 1 | 5 | 60 KIOPS |
| 1 | 6 | 10 KIOPS |

| SYSTEM GROUP ID | STORAGE SUBSYSTEM ID | MANAGEMENT I/F |
|---|---|---|
| system0 | storage0 | 192.168.1.1 |
| system0 | storage1 | 192.168.1.2 |

| STORAGE POOL ID | STORAGE SUBSYSTEM ID | NOT-IN-USE CAPACITY |
|---|---|---|
| Storage-Pool0 | storage0 | 150GB |
| Storage-Pool0 | storage1 | 5000GB |

2100 / 200 / 201

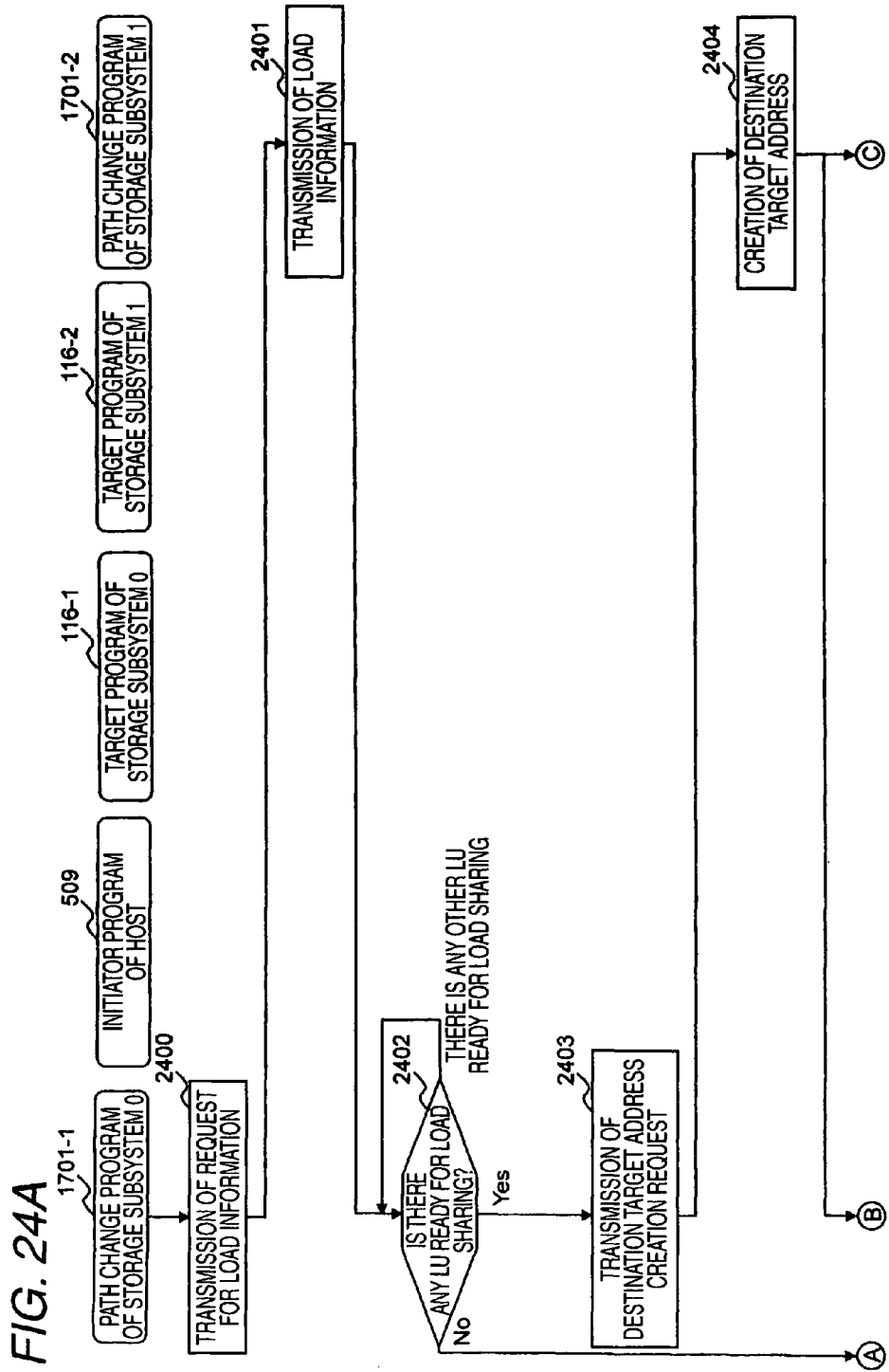

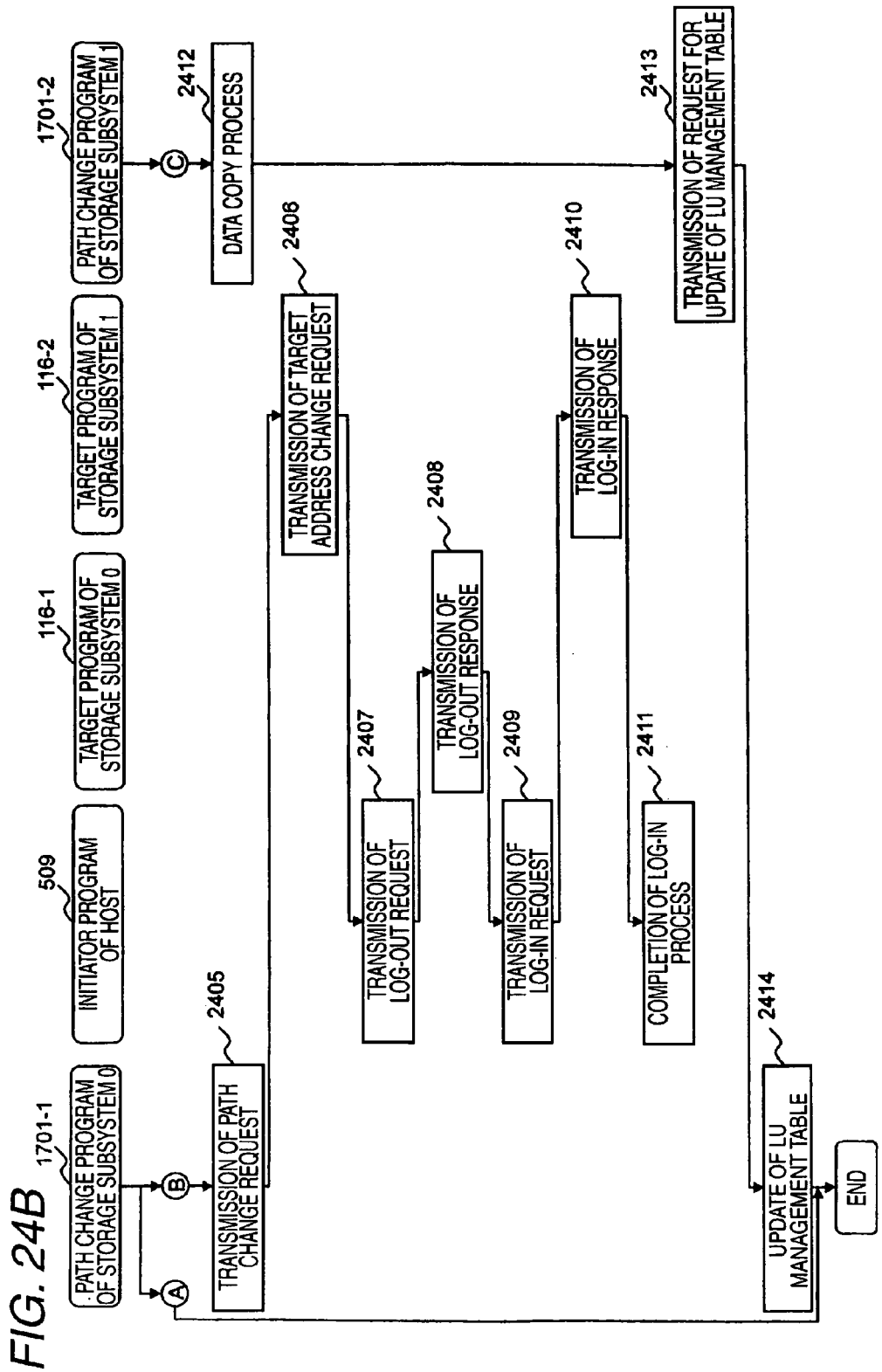

FIG. 25

| COPY AREA | COPY STATE |
|---|---|
| 0000-0009 | COPIED |
| 0010-0019 | COPIED |
| 0020-0029 | NOT COPIED |
| 0030-0039 | NOT COPIED |
| 0040-0049 | NOT COPIED |
| ⋮ | ⋮ |

2500 — COPY AREA
2501 — COPY STATE
1704

FIG. 28

| RAID GROUP ID | CAPACITY | CAPACITY IN USE |
|---|---|---|
| 0 | 300GB | 50GB |
| 1 | 500GB | 200GB |
| 2 | 100GB | 100GB |
| 3 | 100GB | 100GB |
| 4 | 200GB | 50GB |
| ⋮ | ⋮ | ⋮ |

LOAD SHARING METHOD AND SYSTEM FOR COMPUTER SYSTEM

CROSS REFERENCES TO RELATED APPLICATIONS

This application relates to and claims priority from Japanese Patent Application No. 2008-247543, filed on Sep. 26, 2008, the entire disclosure of which is incorporated herein by reference.

BACKGROUND OF THE INVENTION

The present invention relates to a computer system including a storage subsystem and, more specifically, to a load sharing technology in the storage subsystem and with other plurality of storage subsystems.

DESCRIPTION OF THE RELATED ART

In a large-size computer system, a connection is sometimes established among a plurality of storage subsystems for storage of data. If established, however, any specific storage subsystem may be solely under the load, thereby causing a difficulty for the computer system to achieve performance at the limit as close as possible.

The technology for solving such a problem includes sharing of load among a plurality of storage subsystems in a system. The storage subsystems are those each storing data written by a host. An example includes Patent Document 1 (US Patent No. 2004/0210724).

More in detail, with such load sharing, the storage subsystems each manage a plurality of storage areas being splitting results of a logical unit (LU), which is a logical storage area allocated for data writing by a host. When any of the storage subsystems is put under a high level of load due to the increasing I/O (Input/Output) request for any arbitrary storage area being the splitting result, data stored in the storage area being the splitting result is moved to any other storage subsystem under a low level of load. After data moving as such, the low-load storage subsystem now carrying the data is put in charge of processing I/O requests for the data as an alternative to the high-load storage subsystem.

With such a load sharing technology, compared with load sharing of moving an I/O-request-increasing LU to an LU in any other storage system, the load of processing with respect to the I/O requests can be shared more appropriately among the storage subsystems.

SUMMARY OF THE INVENTION

The problem with such a load sharing technology is that, however, no change of communication path is allowed between the host and the storage subsystems because the data movement is performed in the unit of data. Therefore, even after data movement is performed, the storage subsystem being a source of the data remains in charge of performing communications related to the I/O requests between the host and the storage subsystems. That is, the host communicates with the storage subsystem being a destination of the data via the storage subsystem being a source of the data.

As a result, there is no change of amount of data communications between the host in the storage subsystem being a source of the data and other storage subsystems, and an imbalance occurs among the storage subsystems in terms of band of use of the communications I/F (interface), thereby failing to use the band of the communications I/F in the system with good efficiency. There is thus a problem of causing a difficulty for the system to achieve the communications performance at the limit as close as possible.

Moreover, as described above, because the storage subsystem in charge of communications related to the I/O requests is not the storage subsystem storing the data, the necessity arises for communications between these storage subsystems, thereby increasing the latency with respect to the I/O requests. This causes another problem of decreasing the level of I/O performance at the limit after load sharing compared with the level before load sharing.

If load sharing is performed not in the unit of data but of LU, on the other hand, the storage subsystem being a destination is increased in load, and thus the objective of load sharing is not yet achieved.

The invention is proposed in consideration of the problems described above, and specifically, an object of the invention is to provide a computer system that can easily achieve the communications performance at the limit as close as possible while achieving the efficient band use of the communications I/F of the system.

Another object of the invention is to provide a computer system that does not cause that much a decrease of the level of the I/O performance at the limit after load sharing compared with the level before the load sharing.

A typical example of the invention is as below. That is, an aspect of the invention is directed to, characteristically, a load sharing method in a computer system including a first storage subsystem, a host computer to be connected to the first storage subsystem, and a management computer to be connected to the first storage subsystem. In the computer system, the host computer includes a first interface to be connected to a network, a first processor to be connected to the first interface, and a first memory to be connected to the first processor. The management computer includes a second interface to be connected to another network, a second processor to be connected to the second interface, and a second memory to be connected to the second processor. The first storage subsystem includes a first controller that controls over data reading and writing from/to a plurality of disk drives. The first controller includes third and fourth interfaces to be connected to the host computer, a fifth interface to be connected to the disk drives, a third processor to be connected to the third, fourth, and fifth interfaces, and a third memory to be connected to the third processor. The first storage subsystem configures a disk drive group from the plurality of disk drives, and creates a plurality of first logical units from a storage area of the disk drive group. The host computer creates a logical storage area configured from a plurality of virtual logical units respectively corresponding to the plurality of first logical units. A communications path is set among the host computer and each of the plurality of first logical units configuring the logical storage area. The host computer accesses, through access to the virtual logical units, the first logical units over the communications path. The load sharing method includes the steps of: monitoring, by the first storage subsystem, a load of the first storage subsystem; and changing, by the first storage subsystem, based on a monitoring result of the load, the communications paths between the first logical units and the host computer.

According to the aspect of the invention, favorably provided is a computer system that can easily achieve the communications performance at the limit as close as possible while achieving the efficient band use of the communications I/F of the system, and a computer system that does not cause

BRIEF DESCRIPTION OF THE DRAWINGS

FIG. 2 is a diagram illustrating an exemplary storage subsystem management table in the first embodiment of the invention;

FIG. 3 is a diagram illustrating an exemplary LU management table in the first embodiment of the invention;

FIG. 4 is a diagram illustrating an exemplary load management table in the first embodiment of the invention;

FIG. 6 is a diagram illustrating an exemplary LVM-LU management table in the first embodiment of the invention;

FIG. 8 is a diagram illustrating an exemplary system group management table in the first embodiment of the invention;

FIG. 15 is a diagram illustrating an exemplary configuration of a target address change request in the first embodiment of the invention;

FIG. 16 is a diagram illustrating an LU management table after the path change process in the first embodiment of the invention;

FIG. 18 is a diagram illustrating an exemplary load management table in the second embodiment of the invention;

FIG. 20 is a diagram illustrating an exemplary system group management table 709 in the second embodiment of the invention;

FIG. 21 is a diagram illustrating an exemplary storage pool management table 1902 in the second embodiment of the invention;

FIG. 24A is a flowchart of a path change process for an iSCSI target in the second embodiment of the invention;

FIG. 24B is another flowchart of the path change process for the iSCSI target in the second embodiment of the invention;

FIG. 25 is a diagram illustrating an exemplary copy-state management table in the second embodiment of the invention;

FIG. 28 is a diagram illustrating an exemplary RAID group management table in the second embodiment of the invention.

DESCRIPTION OF THE PREFERRED EMBODIMENTS

In the below, by referring to the accompanying drawings, described are several embodiments of the invention.

First Embodiment

In a first embodiment, described is a method and system for load sharing between host I/Fs (interfaces) 108-1 and 108-2 (refer to FIG. 1) in terms of a host I/F-used band 400 (refer to FIG. 4). The host I/F-used band 400 is the one put in use when an application program 507 (refer to FIG. 5) accesses any access target, i.e., any successive storage areas. In the below, the expression of "access" means a process of both reading (read) and writing (write) unless otherwise specified.

Figure 1:
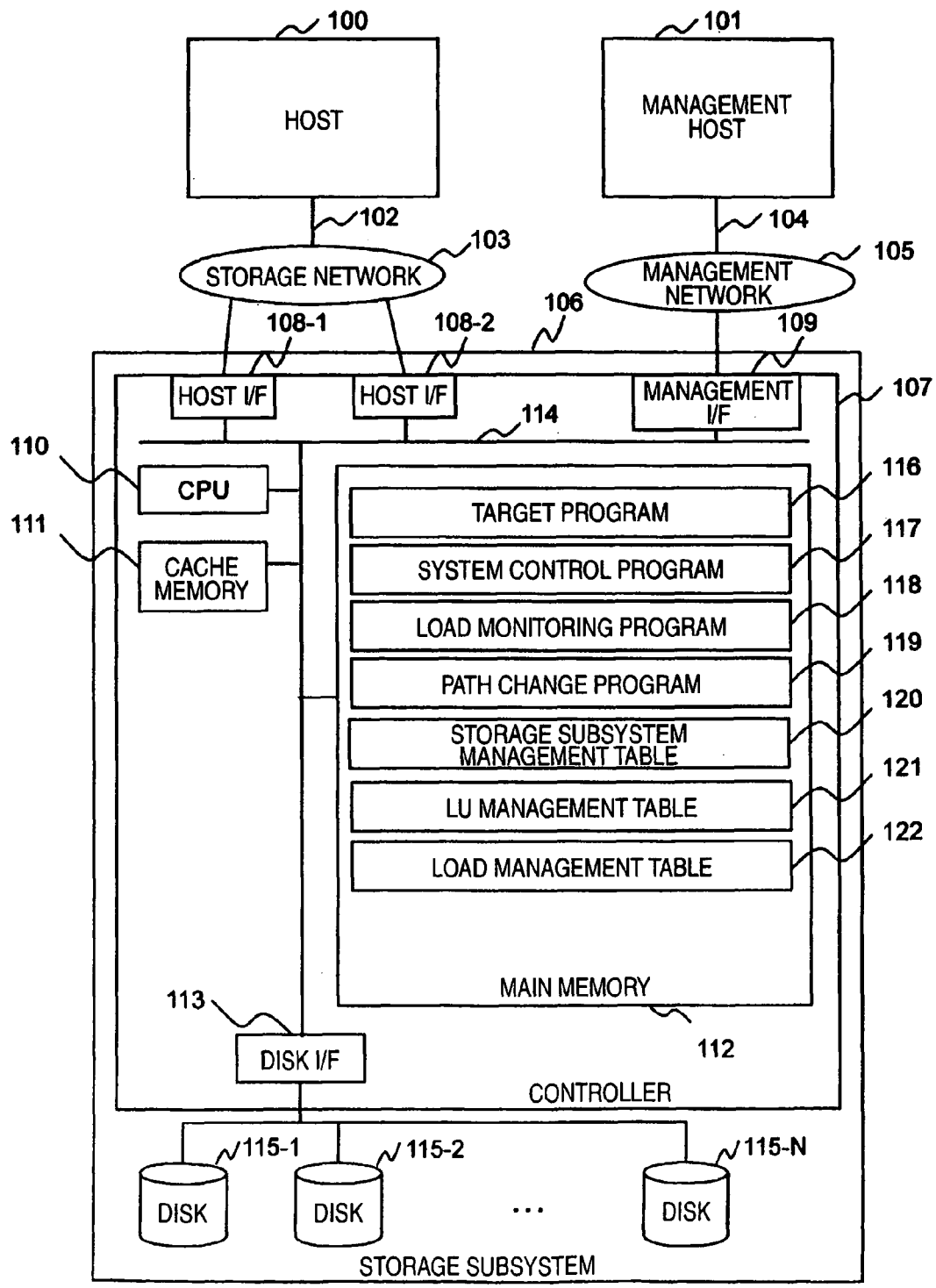
FIG. 1 is a block diagram showing an exemplary configuration of a computer system in a first embodiment of the invention.

FIG. 1 is a block diagram showing an exemplary configuration of a computer system in the first embodiment of the invention.

The computer system is configured to include a host 100, a management host 101, a storage subsystem 106, a storage network 103 for communications between the host 100 and the storage subsystem 106, and a management network 105 for communications between the management host and the storage subsystem.

The host 100 performs data writing to the storage subsystem 106, and data reading therefrom.

The management host 101 is a computer serving to manage the storage subsystem 106.

The storage subsystem 106 provides, to the host 100, an LU (Logical Unit) being a storage area for data writing.

The host 100 and the storage subsystem 106 are connected together over an Ethernet™ cable 102 so that a storage network is formed for use only with communications between the host and the storage subsystem 106.

The management host 101 and the storage subsystem 106 are connected together over an Ethernet™ cable 104, for example, so that a management network 105 is formed for management use of the storage subsystem 106.

The storage subsystem 106 is configured by a controller and a plurality of disks 115.

The controller is configured to include the host I/Fs 108 (108-1 and 108-2), a management I/F 109, a CPU (Central Processing Unit) 110, a cache memory 111, a main memory 112, and a disk I/F 113.

The host I/Fs 108 are each a network device for communications with the host 100, and the storage subsystem 106 communicates with the host 100 using an iSCSI protocol. For example, the host I/F 108-1 is allocated with an IP address of 192.168.0.1, and the host I/F 108-2 is allocated with an IP address of 192.168.0.2.

Herein, the storage subsystem 106 of FIG. 1 is provided with two of the host I/Fs 108, but may be provided with three or more thereof.

The management I/F 109 is a network device for communications with the management host 101, and the storage subsystem 106 communicates with the management host 101 using a TCP/IP protocol (Transmission Control Protocol/Internet Protocol), for example.

The CPU 110 runs a program stored in the main memory 112.

The cache memory 111 is a device serving to increase the speed for data reading and writing by temporarily storing read data and write data to be ready for a request therefor coming from the host 100.

The main memory 112 is a device serving to store programs and management tables.

The disk I/F 113 is a device provided for the CPU 110 to access the disks 115.

The components, i.e., the host I/Fs 108, the management I/F 109, the CPU 110, the cache memory 111, the main memory 112, and the disk I/F 113, are connected together via a bus 114, for example. The disk I/F 113 and the disks 115 are similarly connected by the bus 114, for example.

The main memory 112 stores therein various programs and tables, e.g., a target program 116, a system control program 117, a load monitoring program 118, a path change program 119, a storage subsystem management table 120, an LU management table 121, and a load management table 122.

The target program 116 serves to provide an iSCSI target function, and communicates with an initiator program 509 of the host 100.

The system control program 117 serves to create or delete LUs.

The load monitoring program 118 serves to measure a band of use of the host I/Fs 108 (108-1, 108-2) in the unit of an LU.

The path change program 119 serves to execute a load sharing process when any imbalance occurs between the host I/Fs 108-1 and 108-2 in terms of band of use.

The load sharing process is implemented by changing a path of data from the host I/F 108 (108-1 or 108-2) with a wide band of use to the host I/F 108 (108-1 or 108-2) with a narrow band of use, i.e., by changing a target address. Such a load sharing process will be described later by referring to FIGS. 14A and 14B.

The programs respectively execute processes, which will be described later in detail by respectively referring to flowcharts thereof.

The storage subsystem management table 120 serves to manage information about the storage subsystem 106. The LU management table 121 serves to manage information about LUs. The load management table 122 serves to manage a band in use by each of the LUs. Note here that the tables will be each described in detail by referring to FIGS. 2 to 4.

FIG. 2 is a diagram illustrating an example of the storage subsystem management table 120 in the first embodiment of the invention.

The storage subsystem management table 120 includes elements of "storage subsystem ID 200", "not-in-use capacity 201", and "management I/F 202".

The element of "storage subsystem ID 200" stores identifiers for uniquely identifying each of the storage subsystems 106.

The element of "not-in-use capacity 201" stores the value of the capacity not used as an LU in the storage area of the storage system 106. That is, the element of "not-in-use capacity 201" stores the value of the capacity in the storage area available for allocation to a newly-created LU.

The element of "management I/F 202" stores an IP address allocated to the management I/F 109.

FIG. 3 is a diagram illustrating an example of the LU management table 121 in the first embodiment of the invention.

The LU management table 121 includes elements of "RAID group ID 300", "internal LUN 301", "target name 302", "IP address 303", "port number 304", "external LUN 305, and "LVM-LU ID 306".

The element of "RAID (Redundant Array of Independent Disks) group ID 300" stores identifiers for uniquely identifying each of the RAID groups in the storage subsystem 106.

The element of "internal LUN 301" stores identifiers for uniquely identifying each of the LUs in the storage subsystem 106.

The element of "target name 302" stores the names of iSCSI targets allocated to each of the LUs.

The element of "IP address 303" stores IP addresses of the host I/Fs 108 allocated to each of the iSCSI targets.

The element of "port number 304" stores TCP port numbers of the IP addresses that are each used by the target program 116 to communicate with the initiator program 509.

The element of "external LUN 305" stores identifiers for use by the host 100 to uniquely identify each of the LUs allocated to the iSCSI targets.

The element of "LVM-LU ID 306" stores identifiers for uniquely identifying each virtual LU in the storage system 106. The virtual LU is the one to be created by an LVM program 508, and such a virtual LU is hereinafter referred to as LVM-LU. Managing the LVM-LU IDs respectively corresponding to the internal LUs as such tells which LVM-LU is corresponding to which internal LU. Moreover, by the storage subsystem 106 carrying information about the element of "LVM-LU ID 306", information about correspondence between the LVM-LUs and the LUs can be provided to a management host (not shown), which is not the management host 101 set with an LU for LVM use. The management host being not the management host 101 set with an LU for LVM use is allowed to go through a replication process in the unit of LVM-LU based on any corresponding information, for example.

FIG. 4 is a diagram illustrating an example of the load management table 122 in the first embodiment of the invention.

The load management table 122 includes the elements of "RAID group ID 300", "internal LUN 301", and "IP address 303", and an element of "host I/F-used band 400".

The element of "host I/F-used band 400" stores a network band used by the target program 116 and the initiator program 509 for communications. The load management table 122 manages values being measurement results on the basis of the internal LU corresponding to the iSCSI target.

Figure 5:
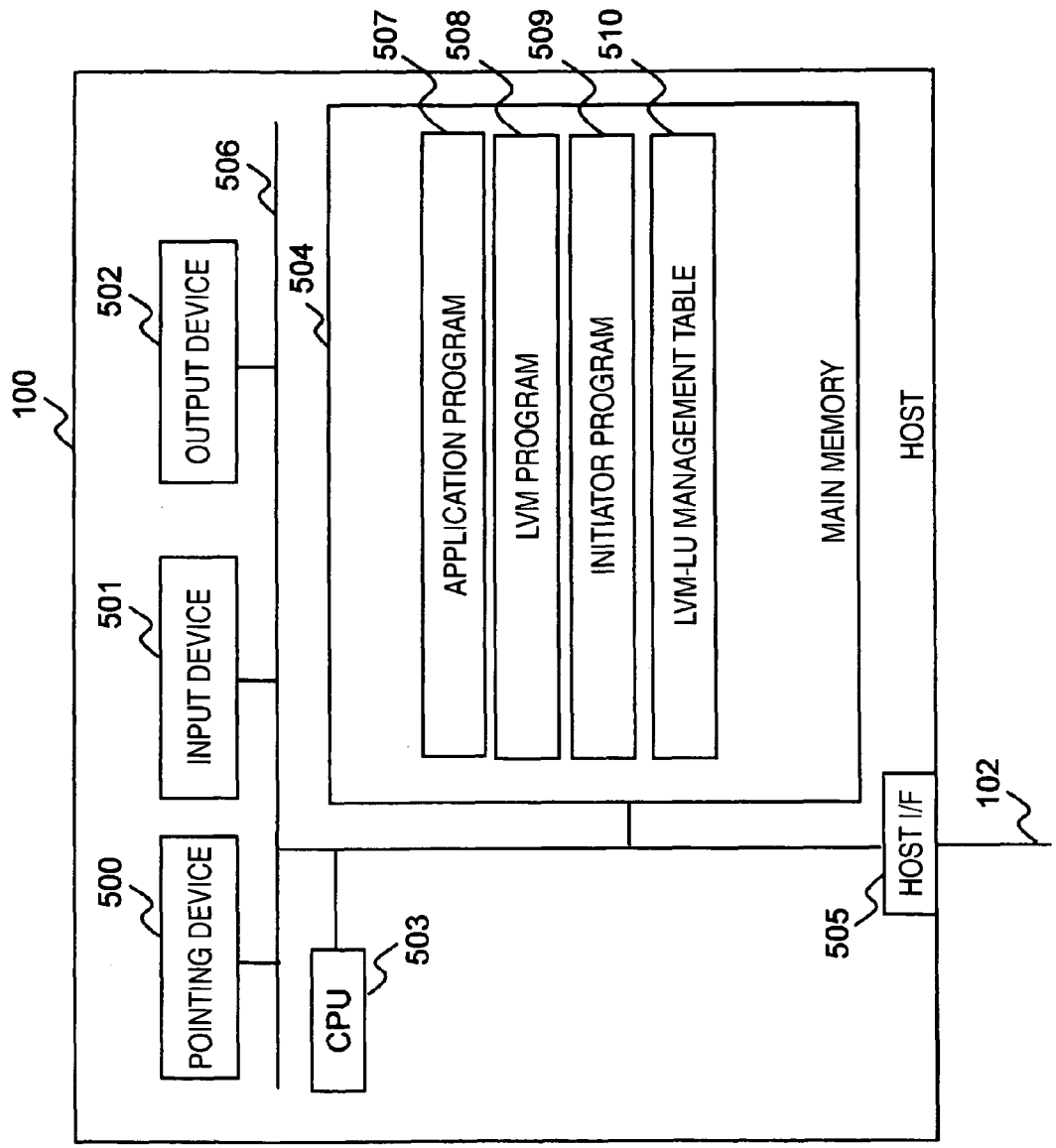
FIG. 5 is a block diagram showing an exemplary configuration of a host in the first embodiment of the invention.

FIG. 5 is a block diagram showing an exemplary configuration of the host 100 in the first embodiment of the invention.

The host 100 is configured to include a pointing device 500, an input device 501, an output device 502, a CPU 503, a main memory 504, and a host I/F 505. The components, i.e., the pointing device 500, the input device 501, the output device 502, the CPU 503, the main memory 504, and the host I/F 505, are connected together via a bus 506, for example.

The pointing device 500 and the input device 501 each transmit, to the CPU 503, information provided by an operator. The pointing device 500 is exemplified by a mouse, and the input device 501 is exemplified by a keyboard.

The output device 502 outputs information requested by the CPU 503. The output device 502 is exemplified by a liquid crystal display.

The CPU 503 runs a program stored in the main memory 504.

The main memory 504 stores therein an application program 507, an LVM program 508, and an LVM-LU management table 510.

The host I/F 505 is a network device for communications with the storage subsystem 106, e.g., the host 100 communicates with the storage subsystem 106 using an iSCSI protocol.

The application program 507 serves to perform data writing to the storage subsystem 106, i.e., write, and performs data reading from the storage subsystem 106, i.e., read. The application program is exemplified by database software.

The LVM (Logical Volume Management) program 508 serves to provide a function with which a plurality of LUs can be handled as a piece of virtual LU.

FIG. 6 is a diagram illustrating an example of the LVM-LU management table 510 in the first embodiment of the invention.

The LVM-LU management table 510 includes an element of "LVM-LU 600", and the elements of "target name 302", "IP address 303", "port number 304", and "external LUN 305".

The element of "LVM-LU 600" stores identifiers for use by the host 100 to uniquely identify each of the LVM-LUs.

Figure 7:
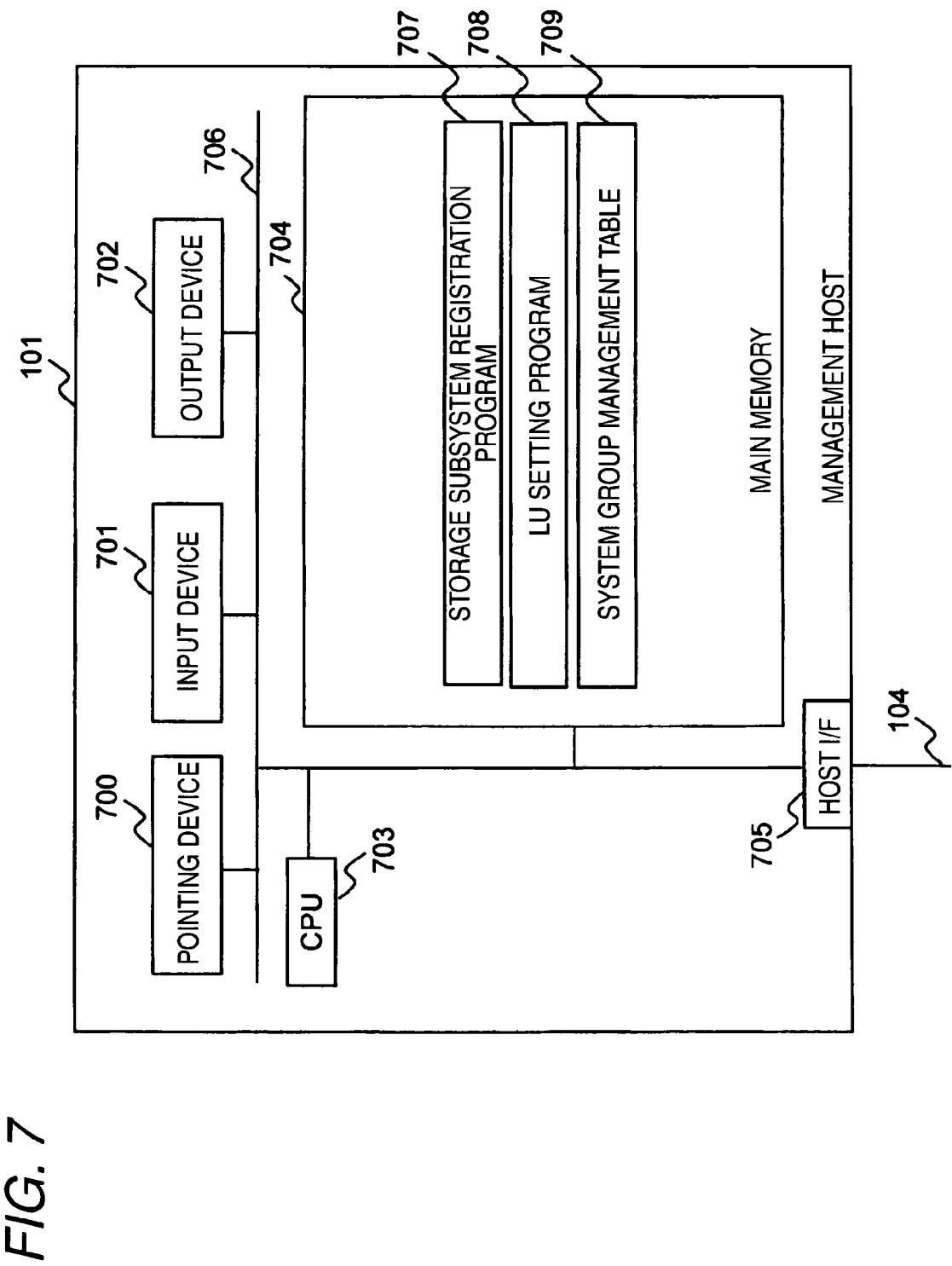
FIG. 7 is a block diagram showing an exemplary configuration of a management host in the first embodiment of the invention.

FIG. 7 is a block diagram showing an exemplary configuration of the management host 101 in the first embodiment of the invention.

The management host 101 is configured to include a pointing device 700, an input device 701, an output device 702, a CPU 703, a main memory 704, and a management host I/F 705. The components of the management host 101, i.e., the pointing device 700, the input device 701, the output device 702, the CPU 703, the main memory 704, and the management host I/F 705, are connected together via a bus 706, for example.

The pointing device 700 and the input device 701 each transmit, to the CPU 703, information provided by an operator. The pointing device 700 is exemplified by a mouse, and the input device 701 is exemplified by a keyboard.

The output device 702 outputs information requested by the CPU 703. The output device 702 is exemplified by a liquid crystal display.

The CPU 703 runs a program stored in the main memory 704.

The main memory 704 stores therein a storage subsystem registration program 707, an LU setting program 708, and a system group management table 709.

The management host I/F 705 is a network device for communications with the storage subsystem 106, e.g., the management host 101 communicates with the storage subsystem 106 using a TCP/IP protocol.

The storage subsystem registration program 707 serves to display a GUI (Graphical User Interface) for use to acquire, from an operator, any information needed for the management host 101 to communicate with the storage subsystem 106.

The LU setting program 708 serves to make setting of, to the storage subsystem 106, LUs configuring the LVM-LU.

The system group management table 709 serves to manage information provided by an operator by the running of the storage subsystem registration program 707.

FIG. 8 is a diagram illustrating an example of the system group management table 709 in the first embodiment of the invention.

The system group management table 709 includes an element of "system group ID 800", and the elements of "storage subsystem ID 200", and "management I/F 202".

The element of "system group ID 800" stores, when the storage subsystems 106 in the computer system are managed in a group, an identifier for uniquely identifying the group in the computer system.

Described now is the outline of the first embodiment.

Figure 12:
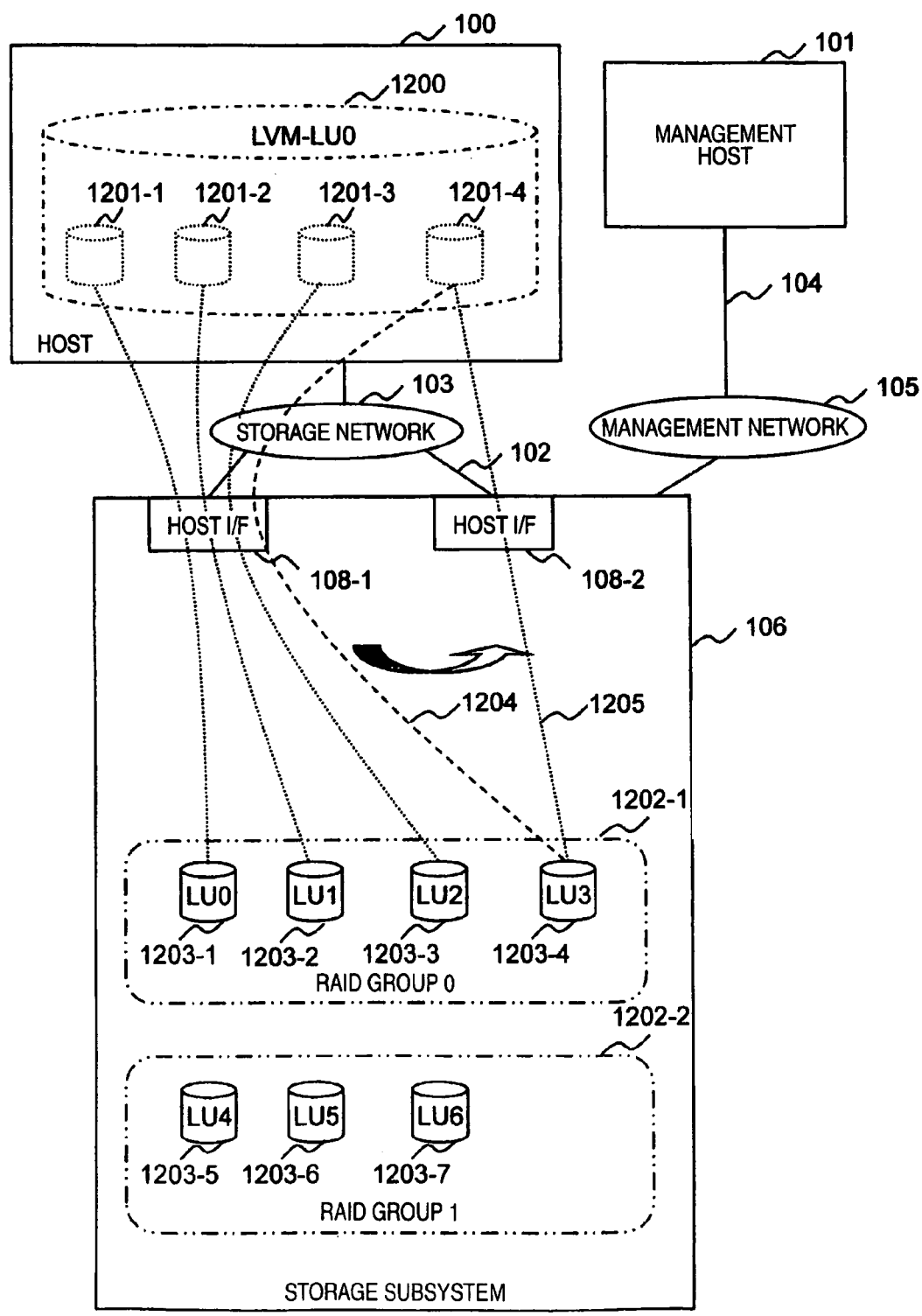
FIG. 12 is a diagram illustrating an exemplary configuration of an LVM-LU, and an exemplary load sharing process in the first embodiment of the invention.

FIG. 12 is a diagram illustrating an exemplary configuration of the LVM-LU, and an exemplary load sharing process in the first embodiment of the invention. In the below, any LU configuring an LVM-LU 1200 to be created on the host 100 is referred to as C-LU (Component-LU) 1201.

The storage subsystem 106 of FIG. 12 includes a RAID group 0(1202-1) and a RAID group 1(1202-2) each configured by a plurality of disks 115.

The RAID group 0(1202-1) includes LUs 1203 (1203-1 to 1203-4) each being a logical storage area created by a physical storage area of the RAID group 0(1202-1). The RAID group 1 (1202-2) similarly includes other LUs 1203 (1203-5 to 1203-7). In the below, such LUs 1203 are also referred to as internal LUs 1203.

The internal LUs 1203 are each allocated with an internal LUN 301. To be specific, the internal LU 1203-1 is allocated with the internal LUN 301 of "LU0", the internal LU 1203-2 is allocated with the internal LUN 301 of "LU1", the internal LU 1203-3 is allocated with the internal LUN 301 of "LU2", the internal LU 1203-4 is allocated with the internal LUN 301 of "LU3", the internal LU 1203-5 is allocated with the internal LUN 301 of "LU4", the internal LU 1203-6 is allocated with the internal LUN 301 of "LU5", and the internal LU 1203-7 is allocated with the internal LUN 301 of "LU6".

In the host 100 of FIG. 12, the LVM-LU 1200 is created from the C-LUs 1201. To be specific, the host 100 includes the LVM-LU 1200 configured by the C-LU 1201-1, the C-LU 1201-2, the C-LU 1201-3, and the C-LU 1201-4.

The correlation is established between the C-LUs 1201 and the internal LUs 1203. To be specific, the C-LU 1201-1 is correlated with the internal LU 1203-1, the C-LU 1201-2 is correlated with the internal LU 1203-2, the C-LU 1201-3 is correlated with the internal LU 1203-3, and the C-LU 1201-4 is correlated with the internal LU 1203-4.

The C-LUs 1201 (C-LU 1201-1 to C-LU 1201-4) access the internal LUs 1203 (internal LU 1203-1 to internal LU 1203-4) via the host I/F 108-1.

As shown in FIG. 12, the host I/F 108-1 has a wide band of use, and thus is put under the load. In the first embodiment of the invention, by the load sharing process that will be described later, a change of path is made to go via the host I/F 108-2 for accessing, i.e., change of target address. For example, in FIG. 12, a path (target address) 1204 of the internal LU 1203-4 is changed to a path (target address) 1205. This path change favorably reduces the load of the host I/F 108-1.

Such a path change is possible because the LVM-LU 1200 is configured by a plurality of C-LUs 1201, and because the host I/F 108 is monitored in terms of band of use on the basis of the internal LU 1203.

Described below is a method of creating the LVM-LU 1200.

First of all, an operator activates the storage subsystem registration program 707, and registers the storage subsystem(s) 106 of the computer system.

Although not shown, on a storage subsystem registration screen displayed by the storage subsystem registration program 707, the operator makes inputs of values to the elements of "system group ID 800" and "IP address 303". The value to the "IP address 303" is the one allocated to the management I/F 109 of the storage subsystem 106 being a registration target.

Using the value entered into the element of "IP address 303", the storage subsystem registration program 707 asks the system control program 117 of the storage subsystem 106 to provide the storage subsystem ID 200.

The system control program 117 refers to the storage subsystem management table 120, and forwards a response including the storage subsystem ID 200 to the storage subsystem registration program 707.

The storage subsystem registration program 707 then enters, to the system group management table 709, the value inputs made by the operator into the element of "system group ID 800" and "IP address 303", and the value of the storage subsystem ID 200 acquired from the storage subsystem 106.

The operator then creates, using the LU setting program 708, the C-LU 1201 configuring the LVM-LU 1200 into the storage subsystem 106.

In the computer system of the first embodiment, the C-LU 1201 is plurally created, and to the LVM-LU created by the resulting plurality of C-LUs 1201, the application program 507 makes an access.

Described first is a process of creating the C-LUs 1201, i.e., a process of creating the internal LUs 1203.

Figure 10:
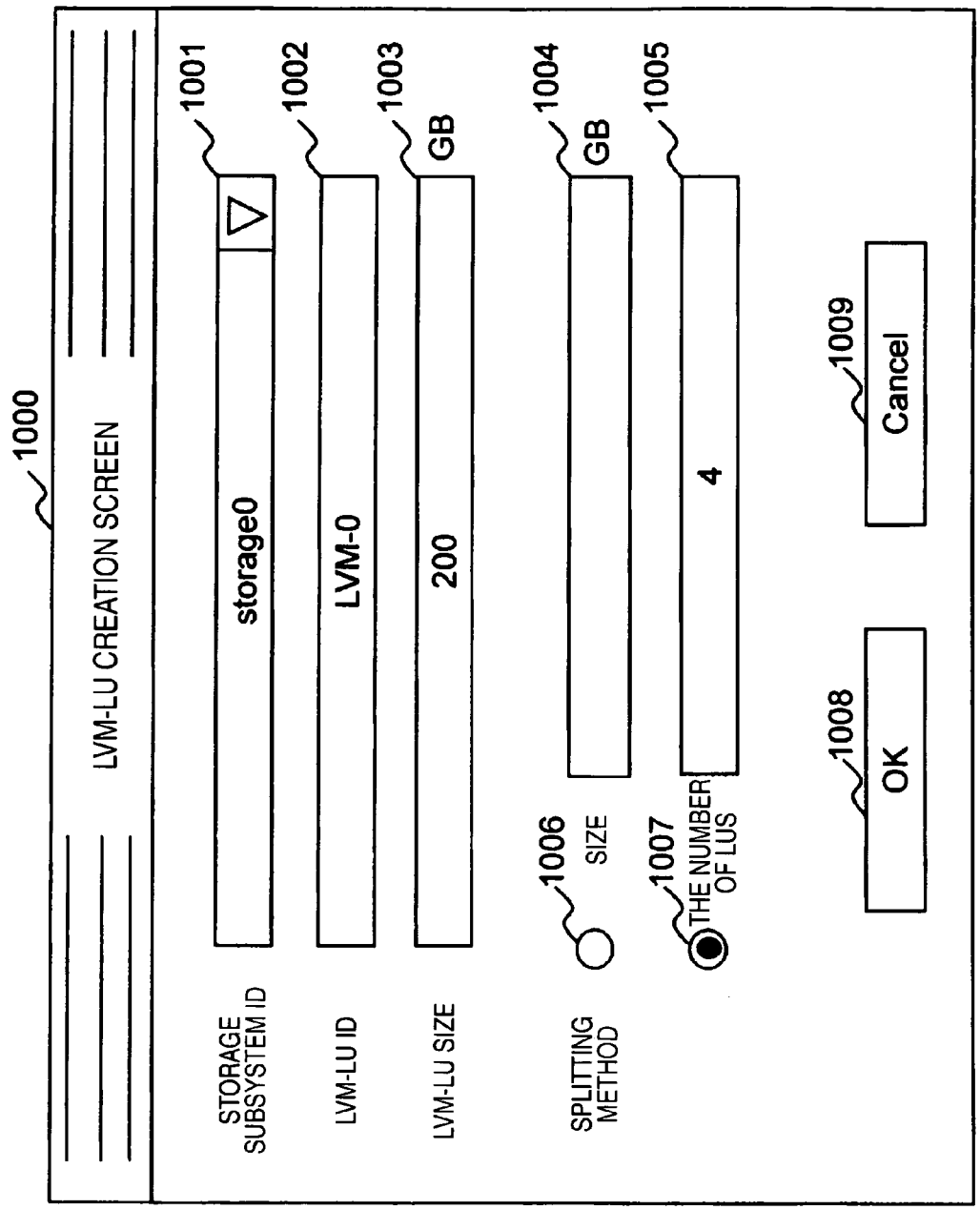
FIG. 10 is a diagram illustrating an exemplary LVM-LU creation screen in the first embodiment of the invention.

The process of creating the C-LUs 1201 is executed based on information input through an LVM-LU creation screen 1000 (refer to FIG. 10). Described now is the LVM-LU creation screen 1000.

FIG. 10 is a diagram illustrating an example of the LVM-LU creation screen 1000 in the first embodiment of the invention.

The LVM-LU creation screen 1000 is configured by entries of "storage subsystem ID 1001", "LVM-LU ID 1002", "LVM-LU size 1003", "size 1006" under a splitting method, "input area 1004" for the size, "the number of LUs 1007" under the splitting method, "input area 1005" for the number of LUs, "OK button 1008", and "cancel button 1009".

The entry of "storage subsystem ID 1001" is a pull-down menu showing selection options of the values of the "storage subsystem IDs 200" found with reference to the system group management table 709.

The entry of "LVM-LU ID 1002" is a text area for input of the LVM-LU ID.

The entry of "LVM-LU size 1003" is a text area for input of the size of the LVM-LU 1200 to be created.

The splitting method indicates how to split the LVM-LU 1200 into the C-LUs 1201, and includes the entries of "size 1006" and "the number of LUs 1007". The entry of "size 1006" comes with the entry of "input area 1004" for input of the size, and the entry of "the number of LUs 1007" comes with the entry of "input area 1005" for input of the number of LUs.

The entry of "size 1006" is for splitting the LVM-LU 1200 into the C-LUs 1201 by the size designated in the entry of "input area 1004", and the entry of "the number of LUs 1007" is for splitting the LVM-LU 1200 into the number of C-LUs 1201 designated in the entry of "input area 1005". The operator selects either of these methods for splitting the LVM-LU 1200 into the C-LUs 1201.

For example, for splitting the LVM-LU 1200 with "200 GB" in the entry of "LVM-LU size 1003" into the four C-LUs 1201, selected is the entry of "the number of LUs 1007" for the splitting method, and to the entry of "input area 1005", an input of "4" is made.

The entry of "OK button 1008" is a button for use to determine the creation details of the C-LUs.

The entry of "cancel button 1009" is a button for use to cancel the C-LU creation process.

The operator makes inputs of any needed information to each of the entries, and operates the entry of "OK button 1008" so that the C-LUs 1201 are accordingly created. Described in detail below is the process of creating the C-LUs 1201.

Figure 9:
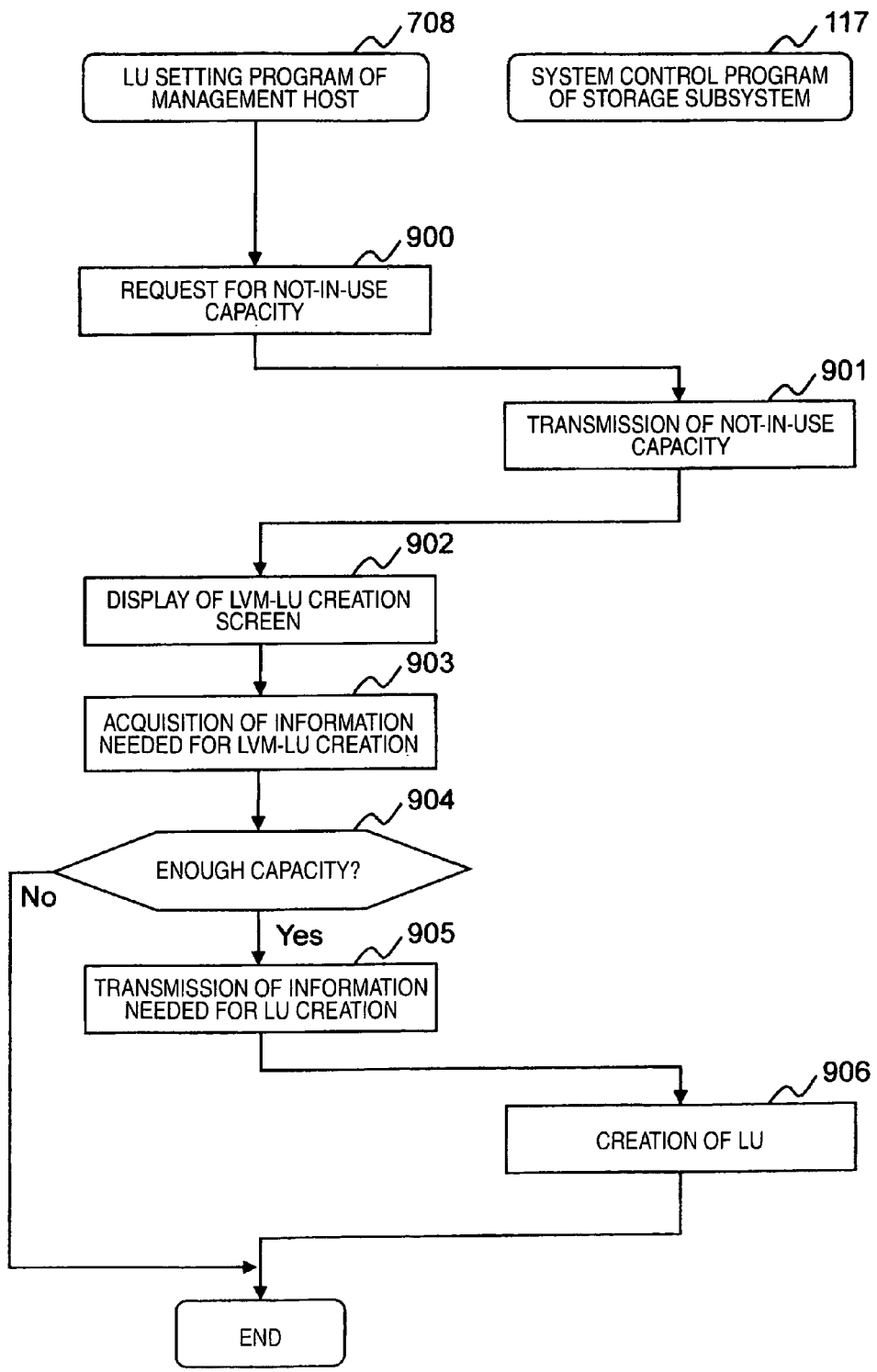
FIG. 9 is a flowchart of a C-LU creation process in the first embodiment of the invention.

FIG. 9 is a flowchart of the process of creating the C-LUs 1201 in the first embodiment of the invention.

When an operator activates the LU setting program 708, the following process is responsively executed.

The LU setting program 708 of the management host makes a request, to the system control program 117 of the storage subsystem 106, for the value of the "not-in-use capacity 201" found in the system group management table 709 (900).

Upon reception of the request for the value of "not-in-use capacity 201", the system control program 117 refers to the storage subsystem management table 120, and forwards the corresponding value of the "not-in-use capacity 201" to the LU setting program 708 (901).

The LU setting program 708 receives the value of the "not-in-use capacity 201" from the system control program 117, and displays the LVM-LU creation screen 1000 on the output device 702 (902).

The LU setting program 708 acquires any information needed for creation of the C-LUs 1201 (903). To be specific, using the LVM-LU creation screen 1000 displayed on the output device 702, the operator selects the value of the "storage subsystem ID 200" for creation of the C-LUs 1201, and makes inputs of values of the "LVM-LU ID 306" and the size of the LVM-LU. The operator then selects the method for splitting the LVM-LU 1200 into the C-LUs 1201, inputs any information needed for the splitting method, and operates the OK button 1008.

The LU setting program 708 refers to the value of the "not-in-use capacity 201" acquired from the storage subsystem 106, and determines whether the LVM-LU 1200 of the size designated in the entry of "LVM-LU size 1003" can be created or not (905).

When the determination result is negative, i.e., the LVM-LU 1200 of the size designated in the entry of "LVM-LU size 1003" cannot be created, the LU setting program 708 displays an error message on the output device 702 to inform the operator that the capacity is not enough, and this is the end of the process.

On the other hand, when the determination result is positive, i.e., the LVM-LU 1200 of the size designated in the entry of "LVM-LU size 1003" can be created, the LU setting program 708 forwards any information needed to create the C-LUs 1201 to the system control program 117 (905).

Upon reception of the information needed for creating the C-LUs 1201, the system control program 117 creates an LU 1203 (refer to FIG. 12) of the designated size into the RAID group 1202 (refer to FIG. 12) having any not-in-use area. The system control program 117 then allocates, to the LU 1203 created as such, the values of the "target name 302", the "IP address 303", the "port number 304", and the "external LUN 305", and then enters, with a correlation, into the LU management table 121, the value of the "RAID group ID 300" of the RAID group created with the LU 1203 as such and the value of the "LVM-LU ID 306" (906). Note here that the element of "LVM-LU ID 306" stores the value input into the entry of "LVM-LU ID 1002".

The system control program 117 combines the value of the "LVM-LU ID 306" to the value of the "target name 302" for allocation to the LU 1203. The value of the "target name 302" is so allocated as to be perfectly unique, e.g., including the identifier of the storage subsystem 106. For allocation of the value of the "IP address 303", the system control program 117 may select the value of the "IP address 303" whose corresponding element of "host I/F-used band 400" is showing the smallest value with reference to the load management table 122, or may make the operator to designate which value of the "IP address 303" using the LVM-LU creation screen 1000.

By going through such steps, in the storage subsystem 106, the LU 1203 as a part of the LVM-LU 1200 can be created. Herein, the LU 1203 as a part of the LVM-LU 1200 created in the storage subsystem 106 as such is acknowledged by the initiator program 509 as an iSCSI target.

Described next is a process of creating the LVM-LU 1200.

Figure 11:
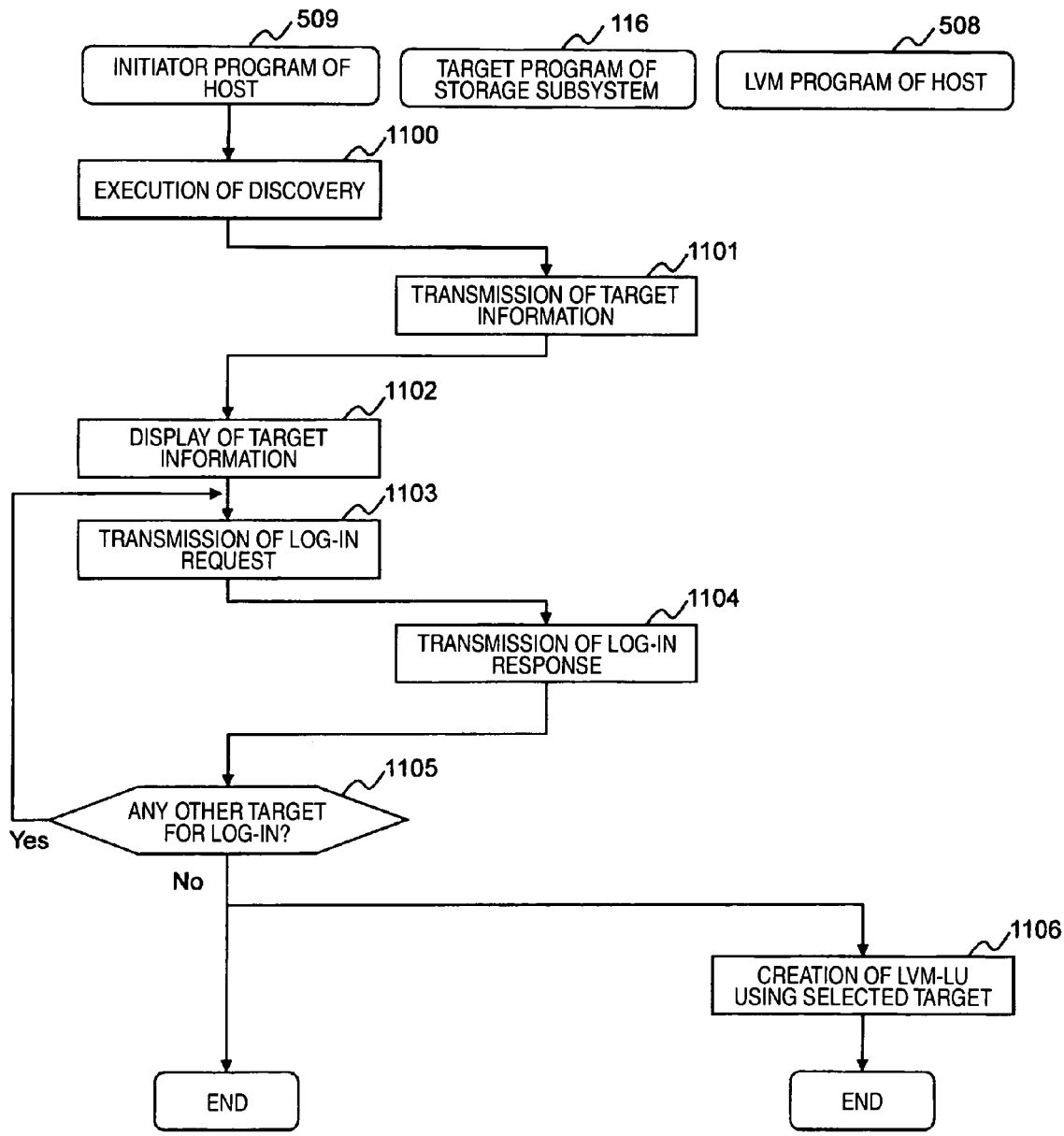
FIG. 11 is a flowchart of an LVM-LU creation process in the first embodiment of the invention.

FIG. 11 is a flowchart of the process of creating the LVM-LU 1200 in the first embodiment of the invention.

The initiator program 509 of the host 100 starts a discovery session by issuing a SendTargets command to an iSCSI target connected to the storage network 103, and waits for a response from the iSCSI target (1100).

Upon reception of the SendTargets command, the target program 116 of the storage subsystem 106 forwards, to the initiator program 509, target information including the values of the "target name 302", the "IP address 303", the "port number 304", and the "external LUN 305" (1101).

Upon reception of the target information, the initiator program 509 displays the target information on the output device 502 (1102). The operator then identifies and selects every iSCSI target configuring the LVM-LU 1200 from the value of the "target name 302" displayed on the output device 502, and issues a command to the initiator program 509 for starting a log-in process with respect to the iSCSI targets. In response to such a command from the operator, the initiator program 509 forwards a log-in request to the iSCSI targets being the selection results (1103).

Upon reception of the log-in request, the target program 116 executes the log-in process, and notifies the completion of the process to the initiator program 509 (1104). Herein, at the time of log-in, the target program 116 authenticates the initiator program 509 asking for log-in using CHAP (Challenge Handshake Authention Protocol), for example.

The initiator program 509 then determines whether or not there is any other iSCSI target that is supposed to be logged in (1105).

When the determination result is positive, i.e., there is some other iSCSI target that is supposed to be logged in, the procedure returns to step 1103, and the initiator program 509 executes the process similarly.

When the determination result is negative, i.e., there is no other iSCSI target that is supposed to be logged in, this is the end of the process.

The operator activates the LVM program 508 of the host 100, and creates the LVM-LU 1200 from all of the logged-in iSCSI targets. The LVM program 508 allocates an LVM-LUN 600 to the resulting LVM-LU 1200, and enters, into the LVM-LU management table 510, the information about the iSCSI targets configuring the LVM-LU, i.e., the values of the "target name 302", the "IP address 303", the "port number 304", and the "external LUN 305" (1106).

With such a process, the host 100 can be created with the LVM-LU 1200. The application program 507 accesses such an LVM-LU 1200 configured by a plurality of iSCSI targets and created logically.

Described next is a process of monitoring the band of use of the host I/F 108.

Figure 13:
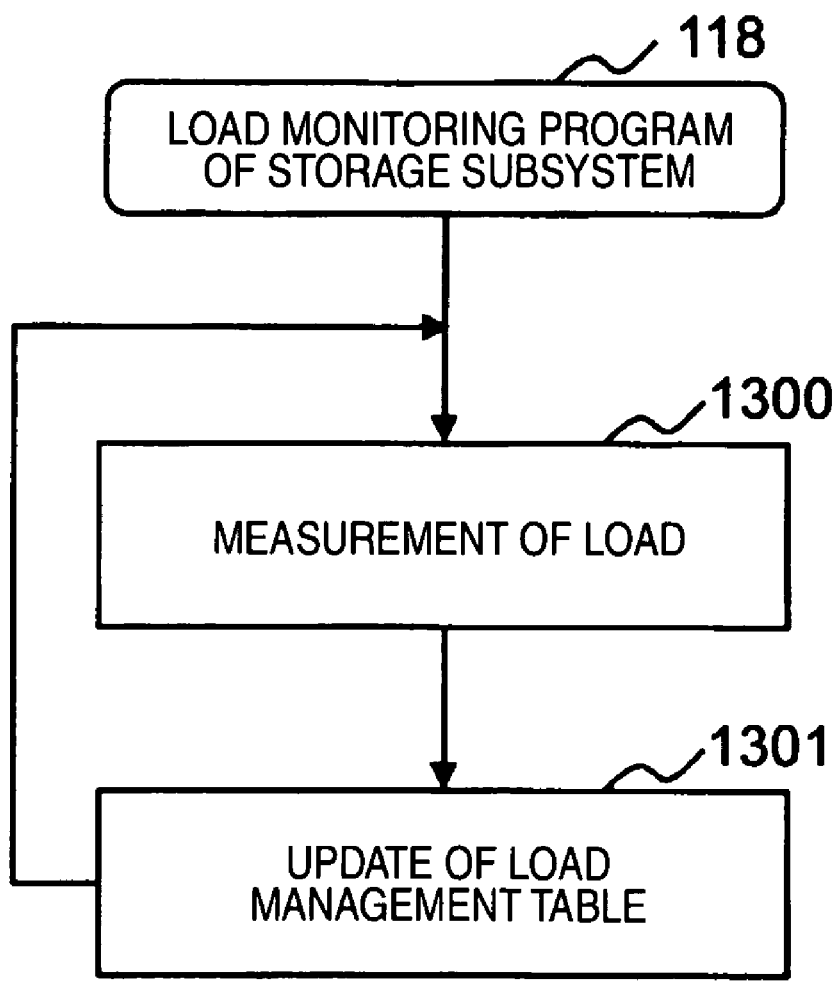
FIG. 13 is a flowchart of a load monitoring process in the first embodiment of the invention.

FIG. 13 is a flowchart of the load monitoring process in the first embodiment of the invention. The load monitoring program 118 is executed automatically after the storage subsystem 106 is turned ON, and is kept running until the storage subsystem 106 is turned OFF, for example.

The load monitoring program 118 of the storage subsystem 106 refers to the elements of the LU management table 121, i.e., the elements of "internal LUN 301" and "IP address 303", and measures the band of use of the host I/F 108 in use for every internal LU (1300). The band of use denotes an average use of bps (bite per sec) for a week, for example. After the load monitoring program 118 measures the average use of bps for a week, the procedure goes to step 1301.

The load monitoring program 118 enters, into the load management table 122, the information about the internal LU being a measurement target, i.e., the values of the "RAID group ID 300", the "internal LUN 301", the "IP address 303", and the "host I/F-used band 400" (1301). Thereafter, the load monitoring program 118 executes the above-described process at the regular time intervals, thereby updating the load management table 122.

With such a process, the band of use of the host I/F 108 can be monitored for every internal LU in the storage subsystem 106.

Described next is a path (target address) change process for an iSCSI target.

Figure 14A:
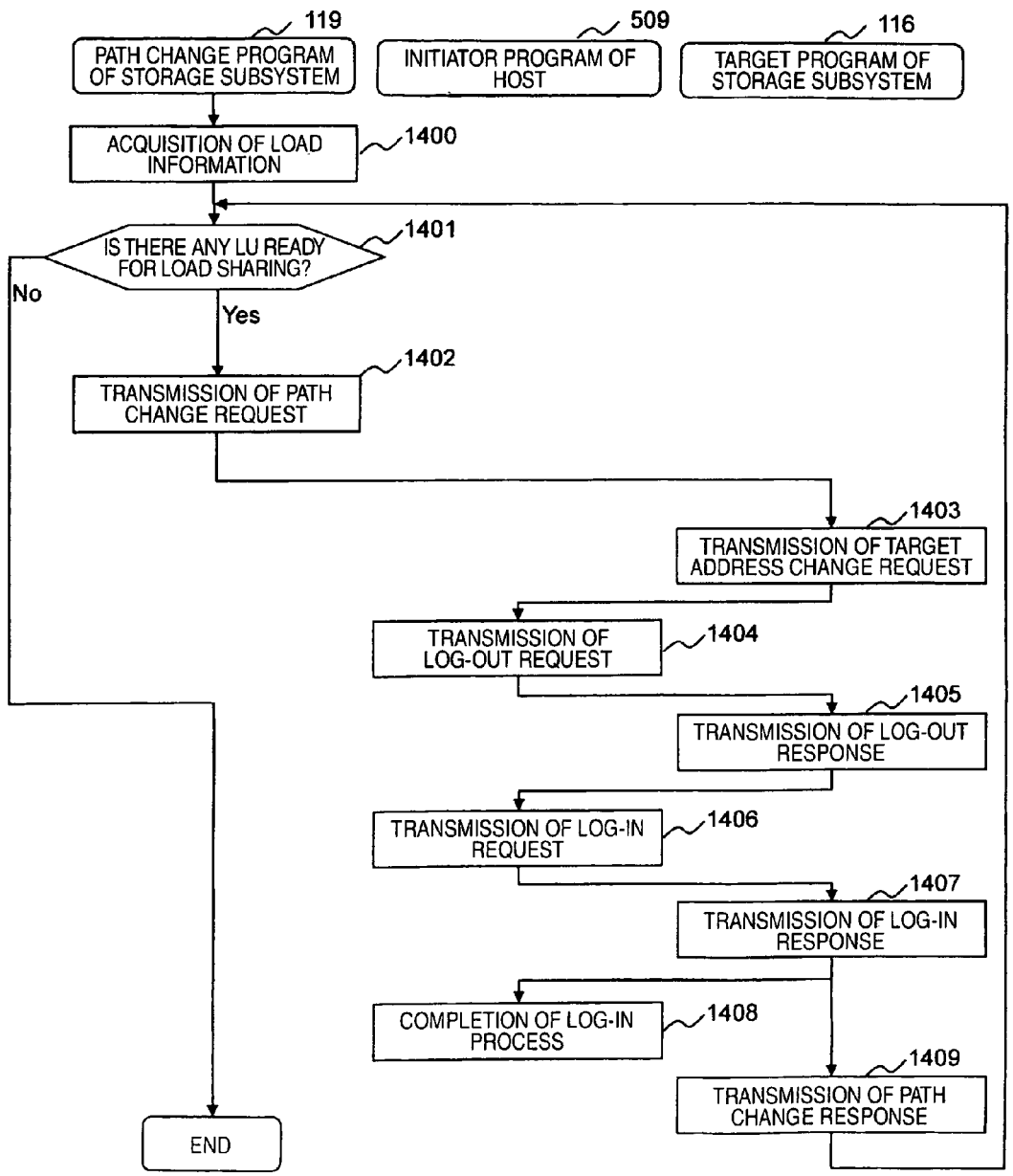
FIG. 14A is a flowchart of a path change process for an iSCSI target in the first embodiment of the invention.

FIG. 14A is a flowchart of the path change process for an iSCSI target in the first embodiment of the invention.

The path change program 119 of the storage subsystem 106 is automatically executed on a week basis after the storage subsystem 106 is turned ON, for example.

The path change program 119 acquires load information about the internal LUs 1203 from the load management table 122 (1400), and the procedure executes the following process.

In step 1401, the path change program 119 determines whether or not there is any internal LU 1203 being ready for load sharing. To be specific, the path change program 119 determines whether or not any imbalance is occurring between the host I/Fs 108-1 and 108-2 in terms of band of use. The imbalance in terms of band of use herein denotes the state in which the largest value of the band of use is twice or more than the smallest value thereof. Herein, the host I/F 108 with the band of use of the largest value is referred to as high-load host I/F, and the host I/F 108 with the band of use of the smallest value is referred to as low-load host I/F.

When the determination result tells that no imbalance is occurring between the host I/Fs 108-1 and 108-2 in terms of band of use, this is the end of the process.

On the other hand, when the determination result tells that some imbalance is occurring between the host I/Fs 108-1 and 108-2 in terms of band of use, the path change program 119 determines whether or not any of the internal LUs 1203 currently allocated with the high-load host I/F can be now allocated with the low-load host I/F. That is, the path change program 119 determines whether or not there is any internal LU 1203 being ready for load sharing.

To be specific, the path change program 119 calculates a difference of band of use between the high-load host I/F and the low-load host I/F. Hereinafter, such a difference is simply referred to as "difference of band of use". The path change program 119 then selects, from the internal LUs allocated with the high-load host I/F, any of the internal LUs 1203 with the band of use closest in value to ½ of the value of such a difference of band of use, and determines thus selected internal LU 1203 as a potential for load sharing. Hereinafter, the internal LU 1203 being a potential for load sharing is referred to as potential internal LU.

When the high-load host I/F 108 that has been allocated to the potential internal LU is changed to the low-load host I/F 108, if the difference of band of use becomes smaller than the difference of band of use before such a change of the host I/F 108, the path change program 119 determines that any of the internal LUs 1203 is ready for load sharing.

In FIG. 4 example, because the host I/F 108-1 is with the band of use of 340 Mbps and the host I/F 108-2 is with the band of use of 120 Mbps, the path change program 119 determines that some imbalance is occurring. In this case, ½ of the difference of band of use is 110 Mbps, and thus the internal LU 1203 showing "3" in the element of "internal LUN 301" is the potential internal LU.

When the host I/F 108-1 of the potential internal LU is changed to the host I/F 108-2, the difference of band of use is reduced so that the path change program 119 determines that any of the internal LUs 1203 is ready for load sharing (1401).

In step 1401, when the determination result tells that any of the internal LUs 1203 is ready for load sharing, the procedure goes to step 1402. Note here that the algorithm for determining which internal LU is ready for load sharing is not restrictive to the one described above, and any algorithm will do as long as the band can be shared thereby for use among the host I/Fs 108, e.g., the use rate of band of the host I/Fs 108.

The path change program 119 forwards, to the target program 116, a path change request for changing the host I/F 108 of the potential internal LU to the low-load host I/F (1402).

Upon reception of the path change request, the target program 116 forwards a target address change request 1500 (refer to FIG. 15) to the initiator program 509 that has been logged in the iSCSI target corresponding to the potential internal LU (1403). The target address change request 1500 will be described later in detail by referring to FIG. 15. The target address change request 1500 includes information about the path after the path change, i.e., the values of the "IP address 303" and the "port number 304".

Upon reception of the target address change request 1500, the initiator program 509 forwards, to the target program 116, a request for logging out from the iSCSI target corresponding to the potential internal LU (1404).

The target program 116 executes a log-out process, and forwards a log-out response to the initiator program 509 to notify the completion of log-out (1405). The target program 116 then allocates, to the potential internal LU, any of the values available for use in the "port number 304", and changes the information about the potential internal LU in the LU management table 121, i.e., the values of the "IP address 303" and the "port number 304".

The initiator program 509 acquires the information about the path after the path change found in the provided target address change request 1500, i.e., the values of the "IP address 303" and the "port number 304". Using thus acquired values of the "IP address 303" and the "port number 304", the initiator program 509 forwards a log-in request to the target program 116 for logging in the iSCSI target to which the value of the "target name 302" logged out in step 1404 is allocated (1406). With such a process, the path of the iSCSI target (target address) is changed but the same iSCSI target remains logged in. That is, the host 100 remains to communicate with the same internal LU 1203.

Upon reception of the log-in request, the target program 116 executes the log-in process, and forwards a log-in response to the initiator program 509 to notify the completion of log-in (1407).

After the initiator program 509 receives the log-in response, the log-in process is ended (1408).

The target program 116 forwards a path-change response to the path change program 119 to notify the completion of the path change. After changing the host I/F 108 of the potential internal LU, the target program 116 then forwards a request to the path change program 119 for searching any other internal LU 1203 being ready for load sharing (1409).

Such a process accordingly enables to make a path change for sharing of the host I/F-used band 400.

In the process described above, exemplified is the case of using the target address change request 1500, but alternatively, a path change can be made utilizing disconnection of the TCP connection. Described now is such a path change utilizing disconnection of the TCP connection.

Figure 14B:
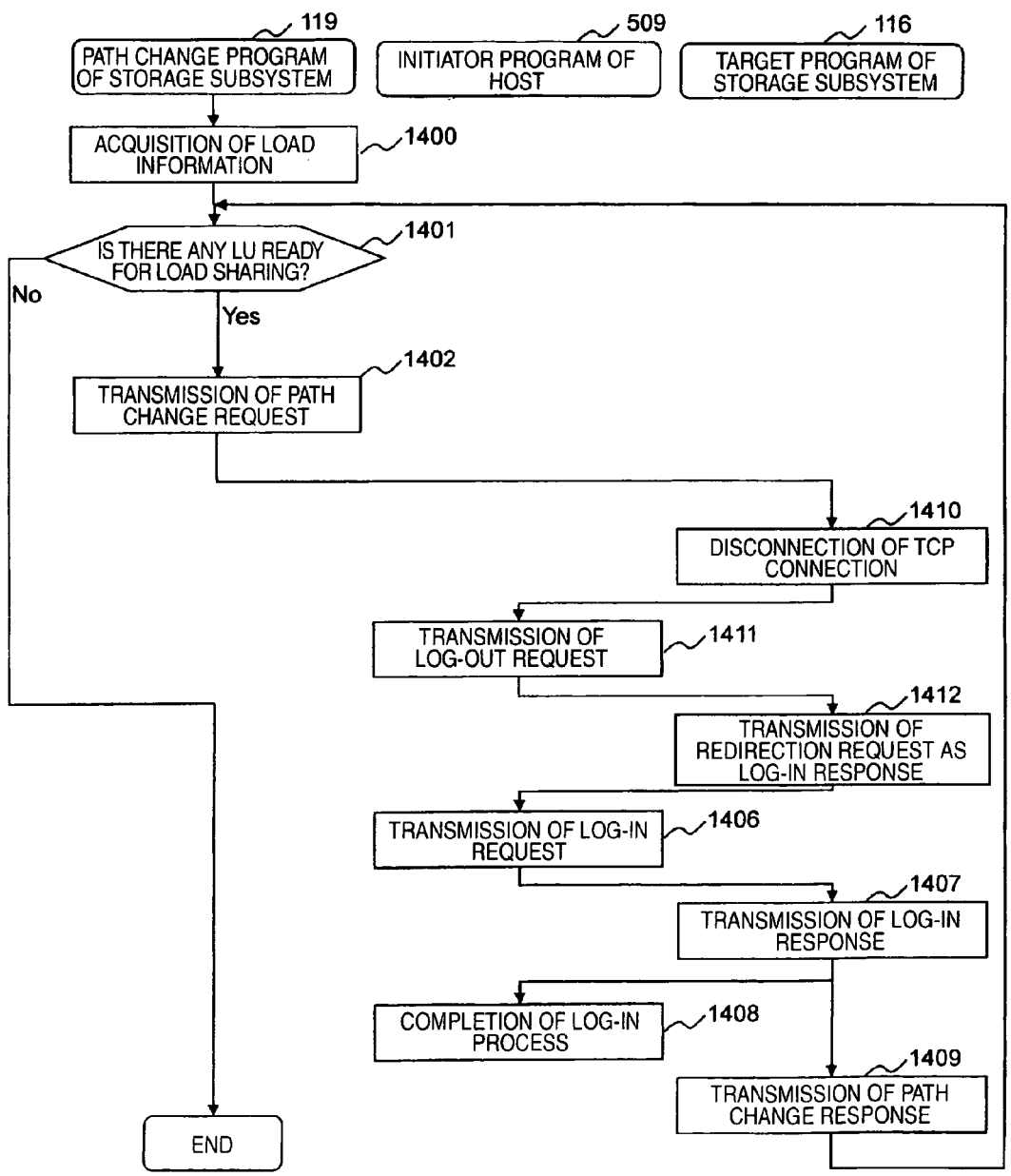
FIG. 14B is another flowchart of the path change process for the iSCSI target in the first embodiment of the invention.

FIG. 14B is another flowchart of the path change process for a iSCSI target in the first embodiment of the invention. Herein, mainly described is any difference from the flowchart of FIG. 14A.

In step 1403, upon reception of the path change request, the target program 116 disconnects the TCP connection of the target address before the path change (1410).

In step 1404, because the TCP connection is disconnected, an iSCSI session that has been established by the initiator program 509 logging in the target is also ended. For logging in again the target that has been established the iSCSI session, the initiator program 509 thus forwards a log-in request to the target program 116 (1411).

In step 1405, upon reception of the log-in request, the target program 116 forwards, to the initiator program, a log-in response of "redirection" indicating the change of the target address in the iSCSI protocol (1412). Herein, the "redirection" specifically denotes a log-in response in which "Status Class" is "1", and "Status Detail" is "2". Such a log-in response includes the target address after the path change.

In step 1406, upon reception of the log-in response, the initiator program 509 forwards a log-in request to the target program 116 to log in the same target using the target address after the path change.

With such a process, the target address can be changed within specs of the iSCSI protocol.

Described next is an exemplary configuration of the target address change request for implementing the path change process of FIG. 14A.

FIG. 15 is a diagram illustrating an exemplary configuration of the target address change request in the first embodiment of the invention.

The iSCSI protocol includes an Asynchronous Message for notifying an event to the iSCSI initiator from the iSCSI target. By transmitting the Asynchronous Message from the iSCSI target to the iSCSI initiator, a request can be made to the iSCSI initiator to log out, for example.

The target address change request 1500 in the first embodiment is implemented by an event of the Asynchronous Message.

The target address change request 1500 is configured by entries of "Byte 1501", "Offset (0) 1502, "Offset (1) 1503", "Offset (2) 1504", "Offset (3) 1505", "DataSegmentLength 1506", "AsycEvent 1507", and "DataSegment 1508".

The entry of "Byte 1501" denotes a start byte and an end byte for a line.

The entries of "Offset (0) 1502" to "Offset (3) 1505" each denote an offset value from the start byte.

The entry of "DataSegmentLength 1506" is set with a value of length for the entry of "DataSegment 1508".

The entry of "AsycEvent 1507" indicates identifiers for uniquely identifying each event coming from the target.

The entry of "DataSegment 1508" is set with iSCSI Event Data, i.e., values of the "IP address 303" and the "port number 304" after the change.

In the first embodiment, the entry of "AsycEvent 1507" is the Asynchronous Message in which "50" is defined as a target address change event, which is not defined in the iSCSI protocol, for example. The value of the "AsycEvent 1507" for use as the target address change event may take any value as long as it is not defined in the iSCSI protocol. When receiving the Asynchronous Message with the value of the "AsycEvent 1507" being "50", the initiator program 509 executes the process for the target address change request.

FIG. 16 is a diagram illustrating the LU management table 121 after the path change process in the first embodiment of the invention.

As a result of the path change process, in the LU management table 121 corresponding to the potential internal LU, the value in the element of "IP address 303" is changed from "192.169.0.1" to "192.168.0.2", and the value in the element of "port number 304" is changed from "50003" to "60003". To be specific, in FIG. 12, it is known that the target address 1204 of the potential internal LU (the internal LU 1203-4 in this example) is changed to the target address 1205.

As described above, in the first embodiment, the load sharing in terms of band of use can be performed among the host I/Fs 108 of the storage subsystem 106 in the unit of the small-capacity internal LU 1203 each being a configuration component of the LVM-LU 1200 being an access target by the application program 507. This enables the efficient use of the band of the communications I/F in the system, thereby favorably leading to the effects of being able to provide a computer system that can achieve the performance at the limit as close as possible.

In the first embodiment, the path change program 119 is assumed as being executed at regular time intervals. Alternatively, the path change program 119 may be executed when the band of use of any specific host I/F 108 exceeds an arbitrary threshold value.

Moreover, the band of use is only a factor for the path change program 119 to determine the potential internal LU in the above. Alternatively, the internal LUs 1203 may be assigned priorities, and any higher-priority internal LU 1203 that can reduce the difference between the high-load host I/F and the low-load host I/F may be determined as a potential internal LU with a first priority.

Alternatively, the LVM-LU creation screen 1000 may be provided with an input of an iSCSI initiator name of the host 100 accessing the C-LUs 1201 configuring the LVM-LU 1200, and the correlation between the iSCSI initiator name and the LUs may be stored in the storage subsystem 106. If this is the case, it becomes possible to limit the iSCSI initiator that can log in the iSCSI target allocated to the C-LUs 1201 configuring the LVM-LU 1200.

Exemplified above is the case of making the operator to designate the method for splitting the LVM-LU 1200 for size reduction on the LVM-LU creation screen 1000. Alternatively, the size and the number of LUs for splitting may be set in advance to eliminate the need for the operator to make inputs thereof.

In the first embodiment, exemplified is the case where the number of the C-LUs 1201 configuring the LVM-LU 1200 is "4". Alternatively, if the number of the C-LUs 1201 is set to be several thousands or several ten thousands, the load sharing process can be executed more optimally, and the band of the host I/F can be used with good efficiency.

Second Embodiment

Described next is a second embodiment of the invention. Note that, in the below, any difference from the first embodiment will be mainly described.

In the second embodiment, described is a method and system for sharing, among a plurality of storage subsystems 106, a disk I/O load generated by the application program 507 without reducing the performance at the limit of the system.

Described first is the outline of the second embodiment.

Figure 27:
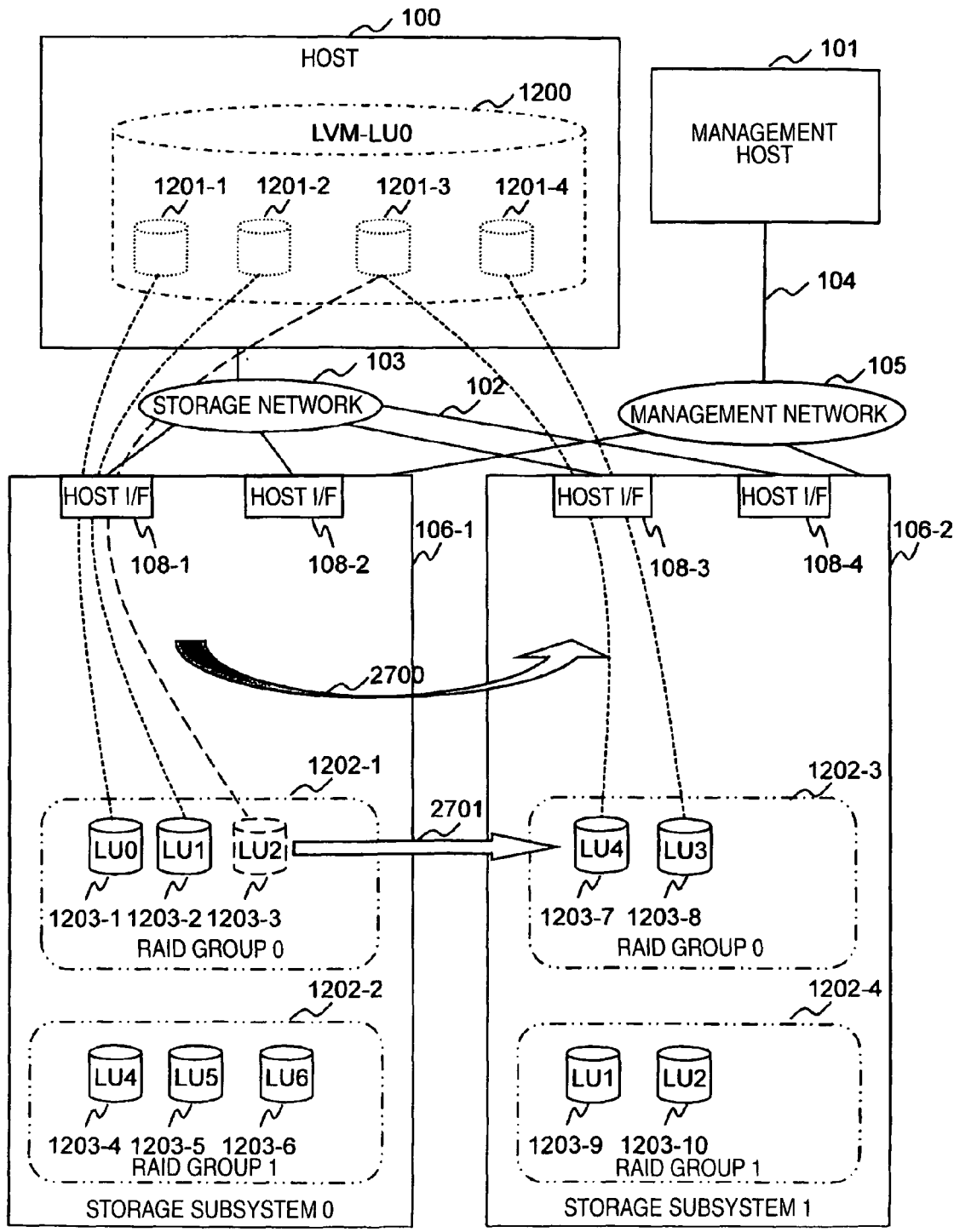
FIG. 27 is a diagram illustrating an exemplary configuration of a computer system, and an exemplary load sharing process in the second embodiment of the invention.

FIG. 27 is a diagram illustrating an exemplary configuration of a computer system and an exemplary load sharing method in the second embodiment of the invention.

The computer system of the second embodiment is configured to include storage subsystems 106-1 and 106-2.

The storage subsystem 106-1 is configured to include the host I/Fs 108-1 and 108-2, which communicate with the host 100 over the storage network 103.

The storage subsystem 106-1 includes a RAID group 0 (1202-1) and a RAID group 1(1202-2), which are each configured by a plurality of disk devices.

The RAID group 0(1202-1) includes internal LUs 1203-1 to 1203-3. The RAID group 1(1202-2) includes internal LUs 1203-4 to 1203-6.

Such internal LUs 1203 are each allocated with the internal LUN 301. To be specific, the internal LU 1203-1 is allocated with the internal LUN 301 of "LU0", the internal LU 1203-2 is allocated with the internal LUN 301 of "LU1", the internal LU 1203-3 is allocated with the internal LUN 301 of "LU2", the internal LU 1203-4 is allocated with the internal LUN 301 of "LU4", the internal LU 1203-5 is allocated with the internal LUN 301 of "LU5", and the internal LU 1203-6 is allocated with the internal LUN 301 of "LU6".

The storage subsystem 106-2 is configured to include host I/Fs 108-3 and 108-4, which communicate with the host 100 over the storage network 103.

The storage subsystem 106-1 includes a RAID group 0 (1202-3) and a RAID group 1(1202-4), which are each configured by a plurality of disk devices.

The RAID group 0(1202-3) includes internal LUs 1203-7 and 1203-8. The RAID group 1(1202-4) includes internal LUs 1203-9 and 1203-10.

Similarly in the storage subsystem 106-2, such internal LUs 1203 are each allocated with the internal LUN 301. To be specific, the internal LU 1203-7 is allocated with the internal LUN 301 of "LU4", the internal LU 1203-8 is allocated with the internal LUN 301 of "LU3", the internal LU 1203-9 is allocated with the internal LUN 301 of "LU1", and the internal LU 1203-10 is allocated with the internal LUN 301 of "LU1".

The host 100 includes the LVM-LU 1200, which is configured by the C-LUs 1201-1, 1201-2, 1201-3, and 1201-4. Such C-LUs 1201 are each correlated with the internal LUs 1203. To be specific, the C-LU 1201-1 is correlated with the internal LU 1203-1, the C-LU 1201-2 is correlated with the internal LU 1203-2, the C-LU 1201-3 is correlated with the internal LU 1203-3, and the C-LU 1201-4 is correlated with the internal LU 1203-8.

In the second embodiment, in FIG. 27, when the storage subsystem 106-1 is increased in disk I/O load, the path of the C-LU 1201-3 is changed from the internal LU 1203-3 to the internal LU 1203-7 (2700), and the data of the internal LU 1203-3 is copied into the internal LU 1203-7 (2701), thereby being able to reduce the disk I/O load in the storage subsystem 106-1.

Figure 17:
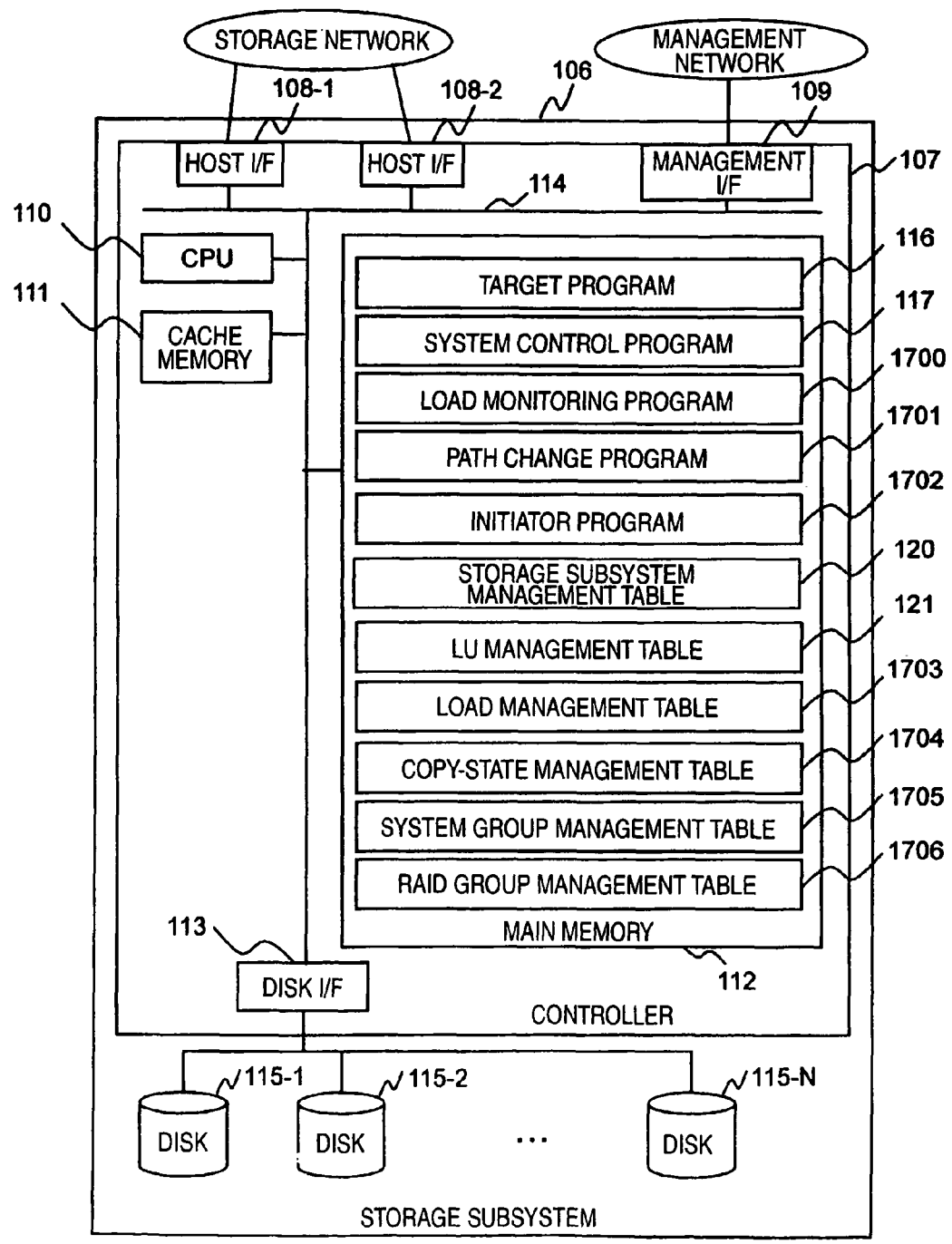
FIG. 17 is a block diagram showing an exemplary configuration of a storage subsystem in a second embodiment of the invention.

FIG. 17 is a block diagram showing an exemplary configuration of the storage subsystem 106 in the second embodiment of the invention.

A load monitoring program 1700 serves to measure values of in an element of "IOPS (Input Output Second) 1800" (refer to FIG. 18) of each of the LUs 1203.

A path change program 1701 serves to execute, when any imbalance occurs between the storage subsystems 106-1 and 106-2 in terms of the values of the "IOPS 1800", the load sharing process for data movement from the storage subsystem 106 with the higher value of the "IOPS 1800" to the storage subsystem 106 with the lower value of the "IOPS 1800".

An initiator program 1702 serves to transmit/receive data to/from the iSCSI target of any other storage subsystem 106 using the iSCSI protocol. The initiator program 1702 is used for moving the data in the internal LUs 1203 to the other storage subsystem 106.

A load management table 1703 serves to manage the values of the "IOPS 1800" for every internal LU.

A copy-state management table 1704 serves to manage an element of "copy-state 2604" (refer to FIG. 25) for use to move the data from one internal LU 1203 to any other internal LU 1203. Such a copy-state management table will be described later by referring to FIG. 25.

A system group management table 1705 serves to manage any information needed for communications with the other storage subsystem 106.

A RAID group management table 1706 serves to manage information about the RAID groups. The system control program 117 updates the RAID group management table when any internal LU 1203 is created or deleted.

FIG. 18 is a diagram illustrating an example of the load management table 1703 in the second embodiment of the invention.

The load management table 1703 includes the elements of "RAID group ID 300", "internal LUN 301", and "IOPS 1800".

The element of "IOPS 1800" indicates an average value of the number of commands issued per unit time, i.e., every second, for each of the internal LUs 1203. The commands here include read and write commands. The load management table 1703 serves to manage the values measured for every internal LU 1203 corresponding to the iSCSI target.

Figure 19:
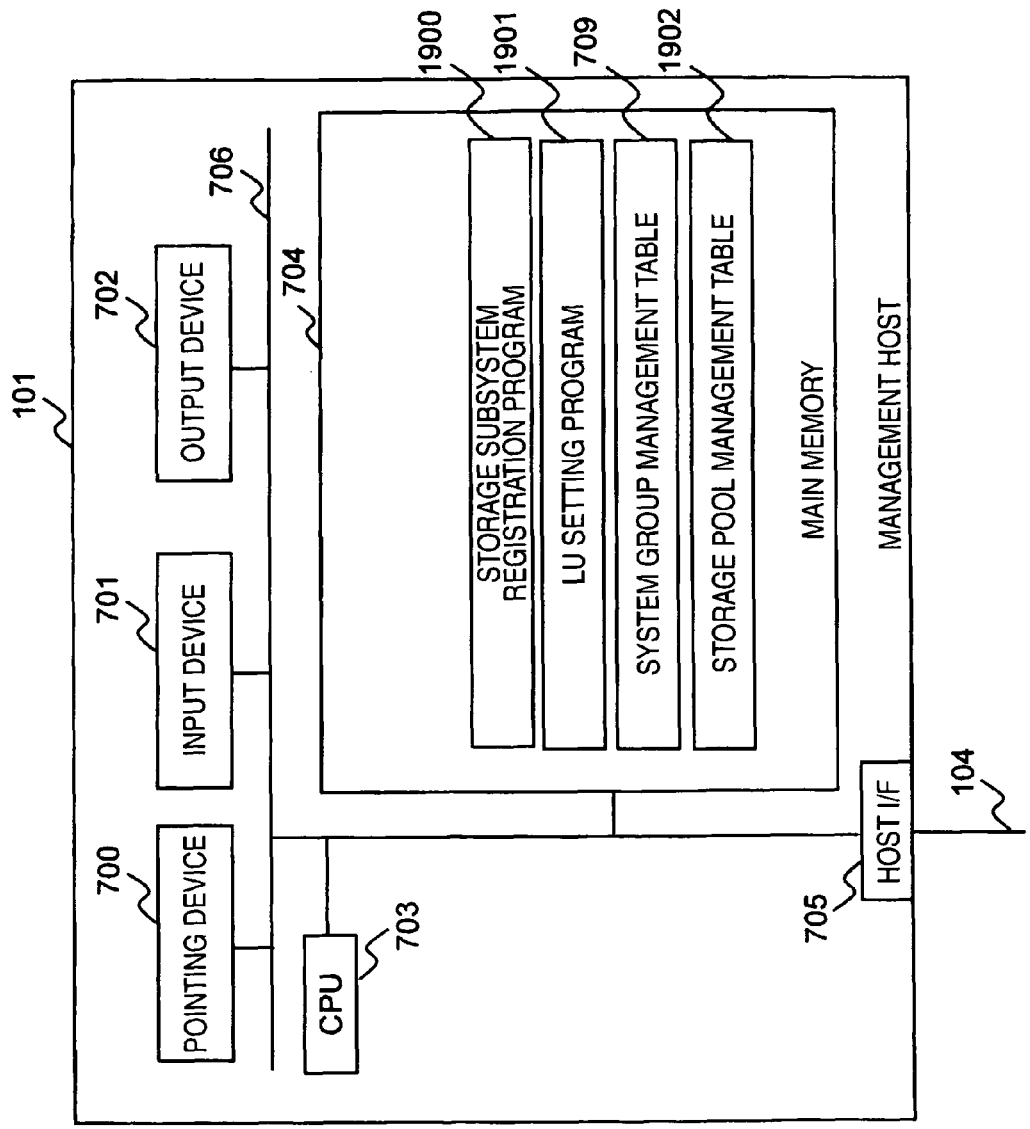
FIG. 19 is a block diagram showing an exemplary configuration of a management host in the second embodiment of the invention.

FIG. 19 is a block diagram showing an exemplary configuration of the management host 101 in the second embodiment of the invention.

A main memory 704 stores a storage subsystem registration program 1900, an LU setting program 1901, the system group management table 709, and a storage pool management table 1903.

The storage subsystem registration program 1900 serves to transmit, to the storage subsystems 106 found in the system group management table 709, when any new storage subsystem 106 is registered, information about the system group management table.

The LU setting program 1901 serves to, when an operator allocates, from a storage pool, any storage area needed for the C-LUs 1201 configuring the LVM-LU 1200, set thus allocated storage area to the storage subsystem 106.

The storage pool management table 1902 serves to manage the values of the "not-in-use capacity 201" of the storage subsystems 106 found in the system group management table 709 for sharing use in the system group. Herein, the storage pool denotes a storage area configured by all of the not-in-use areas in a plurality of storage subsystems 106.

FIG. 20 is a diagram illustrating an example of the system group management table 709 in the second embodiment of the invention.

In FIG. 20 example, the system group management table 709 shows the storage subsystem ID 200 of "storage 0" with the management I/F 202 of "192.168.1.1" is under the system group ID 800 of "system 0" same as the storage subsystem ID 200 of "storage 1" with the management I/F 202 of "192.168.1.2".

FIG. 21 is a diagram illustrating an example of the storage pool management table 1902 in the second embodiment of the invention.

The storage pool management table 1902 includes elements of "storage pool ID 2100" and "storage subsystem ID 200", and the element of "not-in-use capacity 201".

The element of "storage pool ID 2100" indicates identifiers for uniquely identifying each of the storage pools in the system group. In FIG. 21 example, the values of the "storage pool ID 2100" are allocated in the unit of the storage subsystem 106, but alternatively, the values of the "storage pool ID 2100" may be allocated in the unit of the RAID group 1202 of the storage subsystem 106, or in the unit of the disk 115 thereof.

The values of the "storage pool ID 2100" are used for creation of the LVM-LU. The values of the "not-in-use capacity 201" of the storage pool each indicate the capacity for use as the C-LU 1201 at the time of creating the LVM-LU. As such, the LVM-LU 1200 is sometimes created using a storage area not in use in the storage subsystem 106.

In the below, described is a process of creating the LVM-LU 1200. Similarly to the first embodiment, in the process of creating the LVM-LU 1200, settings are made using an LVM-LU creation screen 2300.

Figure 23:
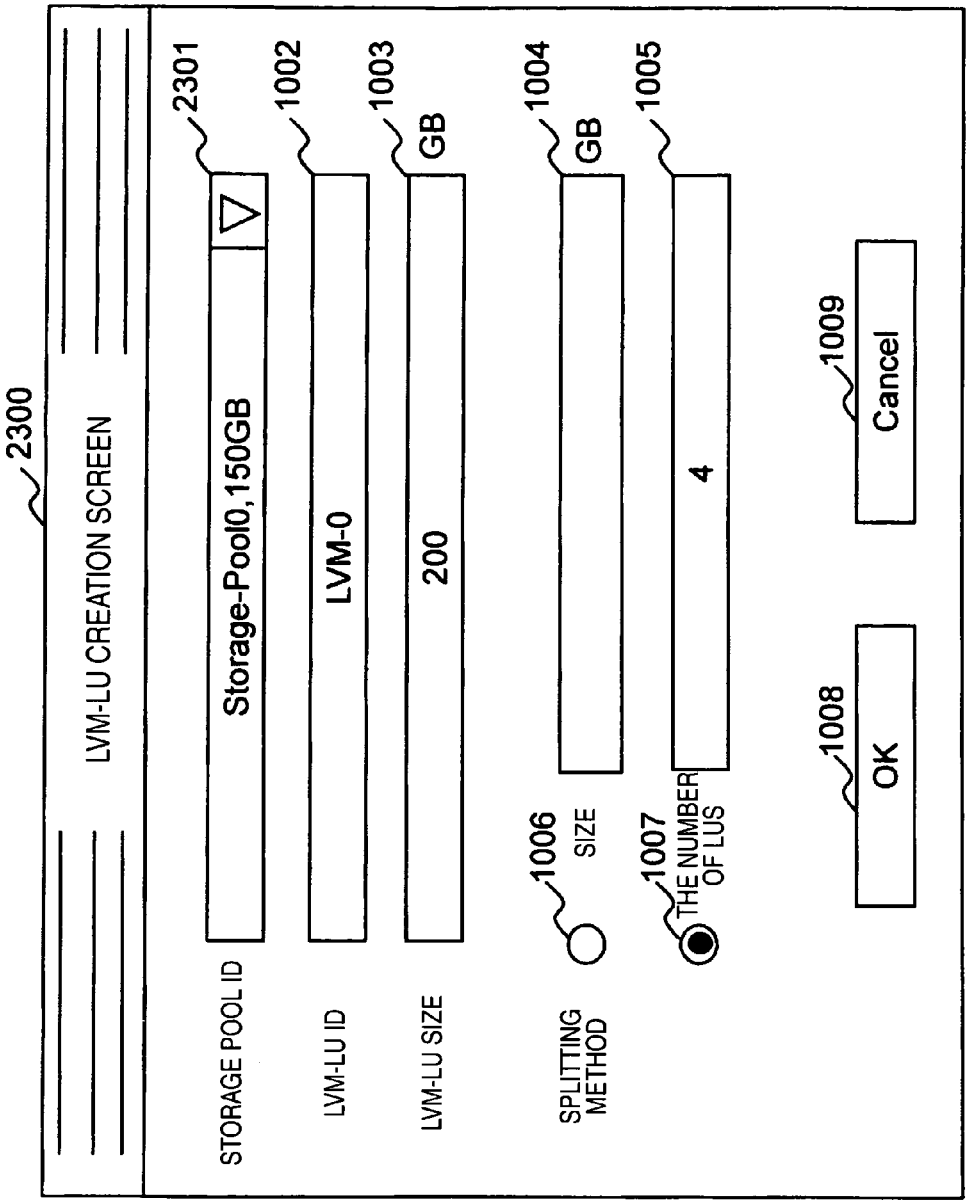
FIG. 23 is a diagram illustrating an exemplary LVM-LU creation screen in the second embodiment of the invention.

FIG. 23 is a diagram illustrating an example of the LVM-LU creation screen 2300 in the second embodiment of the invention.

The LVM-LU creation screen 2300 is configured to include an entry of "storage pool ID 2301", and the entries of "LVM-LU ID 1002", "LVM-LU size 1003", "size 1006" under a splitting method, "input area 1004" for the size, "the number of LUs 1007" under the splitting method, "input area 1005" for the number of LUs, "OK button 1008", and "cancel button 1009".

The entry of "storage pool ID 2301" is a pull-down menu showing selection options of the values of "storage pool IDs 2100" and the "not-in-use capacity 201" found with reference to the storage pool management table 1902.

Figure 22:
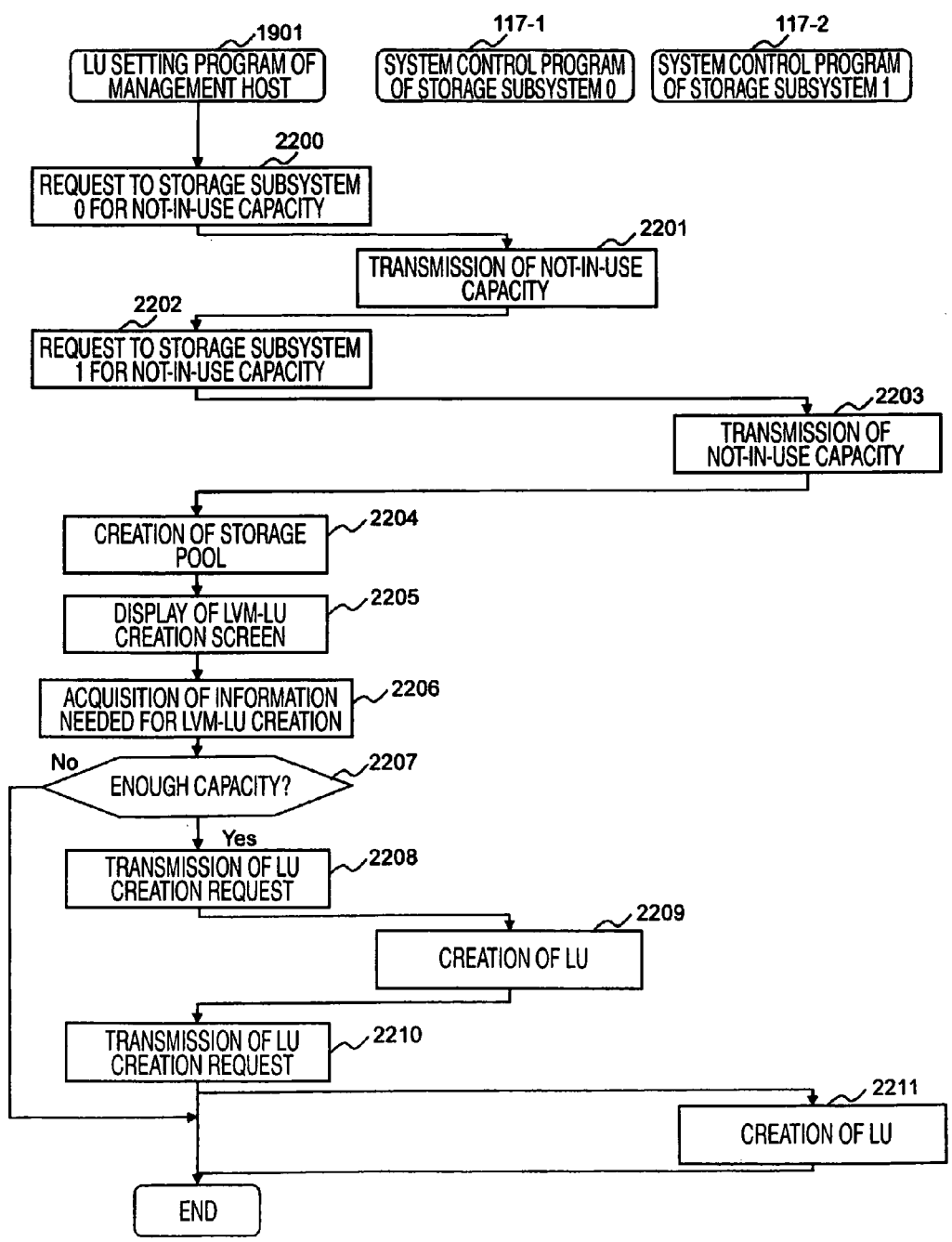
FIG. 22 is a flowchart of an LVM-LU creation process in the second embodiment of the invention.

FIG. 22 is a flowchart of the process of creating the LVM-LU 1200 in the second embodiment of the invention.

The LU setting program 1901 of the management host 101 executes the following process when being activated by an operator.

The LU setting program 1901 acquires the values of the "not-in-use capacity 201" from the storage subsystems 106 found in the system group management table 709, and updates the contents of the storage pool management table 1902 to be the latest. In FIG. 27 example, first of all, the LU setting program 1901 forwards a request to the system control program 117 of the storage subsystem 0 (117-1) to acquire the values of the "not-in-use capacity 201" (2200). In the below, for distinction between the programs and tables provided in each of the storage subsystems, the programs and tables in the storage subsystem 106-1 are each assigned "-1", and the programs and tables in the storage subsystem 106-2 are each assigned "-2".

Upon reception of the request asking for acquisition of the values of the "not-in-use capacity 201", the system control program 117-1 refers to the storage subsystem management table 120-1, and forwards the values of the "not-in-use capacity 201-1" to the LU setting program 1901 (2201).

The LU setting program 1901 updates the value of the "not-in-use capacity 201" for an entry corresponding to the storage subsystem 106-1 of the storage pool management table 1902 to the acquired value of the "not-in-use capacity 201-1". The LU setting program 1901 also forwards a request to the system control program 117-2 for acquiring the values of the "not-in-use capacity 201-2" (2202).

Upon reception of the request asking for acquiring the values of the "not-in-use capacity 201", the system control program 117-2 refers to the storage subsystem management table 120-2, and forwards the values of the "not-in-use capacity 201-2" to the LU setting program 1901 (2203).

The LU setting program 1901 then updates the values of the "not-in-use capacity 201" for an entry corresponding to the storage subsystem 106-2 of the storage pool management table 1902 to be the latest, i.e., to the acquired values of the "not-in-use capacity 201-2". With such a process, the storage pool management table 1902 can be the latest (2204).

The LU setting program 1901 then displays the LVM-LU creation screen 2300 on the output device 702 (2205).

An operator selects any of the values in the element of "storage pool ID 2100" for creation of the C-LUs 1201, and makes value inputs to the element of "LVM-LU ID 1002" and "LVM-LU size 1003". The operator then selects a method for splitting the LVM-LU 1200 into the C-LUs 1201, and makes an input of any information needed for the selected splitting method. The operator checks the input details, and operates the OK button 1008. Through such an operation, the LU setting program 1901 acquires any information needed to create the LVM-LU 1200 (2206).

The LU setting program 1901 determines whether or not the internal LUs 1203 of the size input into the element of "LU size 1003" can be created from the selected storage pool (2207).

When the determination result is negative, i.e., the internal LUs 1203 of the size input into the element of "LU size 1003" cannot be created from the selected storage pool, the LU setting program 1901 displays an error message on the output device to notify the operator that the capacity is not enough, and this is the end of the process.

When the determination result is positive, i.e., the internal LUs 1203 of the size input into the element of "LU size 1003" can be created from the selected storage pool, the LU setting program 1901 forwards, to the system control program 117-1, the LU creation request including information needed to create the internal LUs 1203, i.e., the values of the "LVM-LU ID 306", the number of LUs to be created, and the size thereof (2208).

The system control program 117-1 creates the internal LUs 1203 of the size designated by the RAID group 1202 including any not-in-use area, and registers the resulting internal LUs 1203 into the LU management table 121-1. The system control program 117-1 then forwards an LU creation response to the LU setting program 1901 to notify the completion of the LU creation (2209). Alternatively, for determining to which RAID group 1202 the internal LUs 1203 will be created, the system control program 117-1 may refer to the load management table 1703, and may select any of the RAID groups showing the smallest value of the IOPS, or may make the operator to designate any of the RAID groups using the LVM-LU creation screen 2300.

Upon reception of the LU creation response from the system control program 117-1, the LU setting program 708 forwards, to the system control program 117-2, the LU creation request together with any information needed to create the internal LUs 1203, i.e., the values of the "LVM-LU ID 306", the number of LUs to be created, and the size thereof.

The system control program 117-2 creates the internal LUs 1203 of the size designated by the RAID group 1202 including any not-in-use area, and registers the resulting internal LUs 1203 into the LU management table 121-2. The system control program 117-2 also forwards, to the LU setting program 1901, the LU creation response for notification of the completion of the LU creation.

With such a process, the internal LUs 1203 configuring the LVM-LU 1200 can be created.

As an alternative configuration, the LVM-LU 1200 and the storage pool may be made ready for attribute setting such as high-performance or low-performance for archive purpose, and the C-LUs 1201 configuring the LVM-LU 1200 may be created from the storage pool suitable in consideration of the application of the LVM-LU 1200. Still alternatively, the storage subsystem 106 available for creation of the C-LUs 1201 configuring the LVM-LU 1200 may be plurally designated.

In FIG. 23 input example, the operator makes the LVM program 508 of the host 100 to create the LVM-LU 1200 with the capacity of 200 GB, and with "LVM-0" in the element of "LVM-LU ID 306".

With the LVM-LU 1200 created with such a setting, as shown in FIG. 27, the resulting LVM-LU 1200 is configured by three internal LUs 1203, and one LU. The three internal LUs 1203 are those each with the size of 50 GB and in the storage subsystem 106-1 showing the storage subsystem ID 200 of "storage 0", and the LU is the one with the size of 50 GB and in the storage subsystem 106-1 showing the storage subsystem ID 200 of "storage 1".

Note here that the process of creating the LVM-LU 1200 is similar to the process of creating the LVM-LU 1200 in the first embodiment of the invention (refer to FIG. 11), but there are some differences as below. That is, by the discovery in step 1100, the initiator program 509 acquires target information about both the target programs 116-1 and 116-2. When the selected iSCSI target is found in both of the storage subsystems 106-1 and 106-2, these iSCSI targets are both logged in.

Alternatively, if the host 100 is provided with the management I/F for communication with the management host 101, and by the components working together, i.e., the host 100, the management host 101, and the storage subsystem 106, the LVM-LU 1200 can be created without requiring the operator's time and effort.

After receiving the creation completion response about the internal LUs 1203 from the storage subsystem 106, the LU setting program 1901 forwards the value of the "LVM-LU ID 306" to the initiator program, thereby logging in the iSCSI target configuring the LVM-LU 1200. After completely logging in, the LU setting program 1901 forwards the value of the "LVM-LU 306" to the LVM program 508, thereby creating the LVM-LU 1200 from the iSCSI target allocated with the target name including the value of the "LVM-LU ID 306".

With the process described above, the operator becomes able to automatically create the LVM-LU 1200 only by making inputs to any needed entries on the LVM-LU creation screen 2300.

FIGS. 24A and 24B are each a flowchart of the path change process for the iSCSI target in the second embodiment of the invention.

The path change program 1701-1 is automatically run at intervals of a week after the storage subsystem 106-1 is being turned ON, for example.

The path change program 1701-1 forwards a request for load information to the path change program 1701-2 for acquiring information about any other storage subsystem 106-2 found in the system group management table 1705-1, i.e., information about the total value in the element of "IOPS 1800", and the value of the "not-in-use capacity 201" (2400).

The path change program 1701-2 forwards, to the path change program 1701-1, the load information including the total value in the element of "IOPS 1800" in the load management table 1703, and the value in the element of "not-in-use capacity 210" in the storage subsystem management table 120 (2401).

The path change program 1701-1 determines whether or not there is any internal LU 1203 being ready for load sharing (2402). To be specific, a determination is first made whether or not there is any imbalance in terms of the values of "IOPS 1800" between the storage subsystems 106-1 and 106-2. The imbalance in terms of the values of the "IOPS 1800" denotes the state in which the largest value of the "IOPS 1800" is twice or more than the smallest value thereof. In the below, the storage subsystem 106 showing the highest value of the "IOPS 1800" is referred to as high-load node, and the storage subsystem 106 showing the smallest value of the "IOPS 1800" is referred to as low-load node.

When the determination result tells that no internal LU 1203 is ready for load sharing, i.e., no imbalance is occurring between the storage subsystems 106-1 and 106-2 in terms of the value of the "IOPS 1800", this is the end of the process.

When the determination result tells that any of the internal LUs 1203 is ready for load sharing, i.e., some imbalance is occurring between the storage subsystems 106-1 and 106-2 in terms of the value of the "IOPS 1800", the path change program 1701-1 then determines whether or not there is any internal LU 1203 with a high-load node being ready to move to the internal LU 1203 with a low-load node.

To be specific, first of all, the path change program 1701-1 calculates a difference of the values of the "IOPS 1800" between the high-load node and the low-load node, and selects, from the internal LUs with the high-load node, any of the internal LUs 1203 with the IOPS 1800 closest in value to ½ of the value of such a difference of the IOPS 1800, and determines thus selected internal LU 1203 as a potential for load sharing, i.e., the potential internal LU 1203.

For changing the storage subsystem 106 including the determined potential internal LU 1203, i.e., high-load node, to the low-load node, the path change program 1701-1 then determines that the low-load node has some not-in-use capacity available for movement of the internal LU 1203. Moreover, when the difference of the IOPS 1800 is smaller than the difference before such a change, a determination is made that there is any internal LU 1203 being ready for load sharing. The path change program 1701-1 determines whether or not there is any other internal LU 1203 ready for load sharing from the state after the storage subsystem 106-1 including the potential internal LU 1203 is changed to the storage subsystem 106-2, and thus the process of step 2402 is repeatedly executed. After every potential internal LU 1203 is found by the path change program 1701-1, the procedure goes to step 2403.

In FIG. 18 example, assuming now is a case where the total of the values in the element of "IOPS 1800" for the storage subsystem 106-1 is "450 KIOPS", and the total of the values in the element of "IOPS 1800" for the storage subsystem 106-2 is "160 KIOPS", it means that some imbalance is occurring. A half of the difference of the "IOPS 1800" is "145 KIOPS", and thus the internal LU 1203-03 with the high-load node is the potential internal LU 1203. Changing the storage subsystem 106-1 including the potential internal LU 1203 to the storage subsystem 106-2 reduces the difference, and thus the path change program 1701-1 determines that any of the internal LUs 1203 is ready for load sharing. After changing the storage subsystem 106-1 including the potential internal LU 1203 to the storage subsystem 106-2, the path change program 1701-1 then determines whether or not there is still any other internal LU 1203 being ready for load sharing.

Note here that the algorithm for determining which internal LU 1203 is ready for load sharing is not restrictive to the one described above, and any algorithm will do as long as the values of the "IOPS 1800" can be shared thereby among the storage subsystems 106.

The path change program 1701-1 forwards, to the path change program 1701-2, a request for creating a destination target address (2403). Before transmission, the target address creation request entirely includes the information about the iSCSI target being a source, i.e., the values of the "target name 302", the "LVM-LU ID 306", the "IP address 303", and the "port number 304", and information about the disks 115 being emulated by the internal LUs 1203. The information about the disks 115 includes the size, the model name, the serial number, and others.

Upon reception of the destination target address creation request, the path change program 1701-2 creates, into the RAID group 1202 with some not-in-use capacity, the internal LU 1203 of the size same as that of the internal LU 1203 being a destination.

The criteria for selection of the RAID groups may be the value of the not-in-use capacity, i.e., selected is the RAID group 1202 with the largest value of the not-in-use capacity, or the total of the values of the "IOPS 1800", i.e., selected is the RAID group 1202 with the smallest total value of the "IOPS 1800". Herein, the information about the disks to be emulated by the newly-created internal LU 1203 is information found in the destination target address creation request provided as above.

To the newly-created internal LU 1203, the path change program 1701-2 allocates the values of the "internal LUN 301", the "IP address 303", the "port number 304", and the "external LUN 305". The values of the "target name 302" and "LVM-LU ID 306" for allocation are those found in the destination target address creation request provided as above. The value of the "IP address 303" for allocation is either of the values allocated to the host I/Fs 108-3 and 108-4 of the storage subsystem 106-2.

The path change program 1701-2 enters, into the LU management table 121-2, any information related to the newly-created internal LU 1203. The path change program 1701-2 then forwards a response to the path change program 1701-2 for completion notification of creation of the internal LU 1203. Such a response includes the values of the "IP address 303" and the "port number 304" allocated to thus newly-created internal LU 1203.

Upon reception of the completion notification of the internal LU 1203 from the path change program 1701-2, the path change program 1701-1 forwards a path change request to the target program 116-2 for changing the target address of the potential internal LU 1203 to the low-load node (2405).

Upon reception of the path change request, the target program 116-1 forwards the target address change request 1500 to the initiator program 509 that has been logged in the iSCSI target corresponding to the potential internal LU 1203 (2406).

Upon reception of the target address change request 1500, the initiator program 509 forwards, to the target program 116-1, a log-out request from the iSCSI target corresponding to the potential internal LU 1203 (2407).

Upon reception of the log-out request, the target program 116-1 executes the log-out process, and forwards a log-out response to the initiator program 509 for notifying the completion of log-out (2408).

Upon reception of the log-out response, the initiator program 509 acquires the values of the "IP address 303" and the "port number 304" after the change from the target address change request 1500 received in step 2407. Utilizing thus acquired values of the "IP address 303" and the "port number 304", and the value of the "target name 302" logged out in step 2407, the initiator program 509 forwards, to the target program 116-2, a log-in request for logging in the iSCSI target corresponding to the internal LU 1203 created to the low-load node (2409).

Upon reception of the log-in request, the target program 116-2 executes the log-in process, and forwards a log-in response to the initiator program 509 for notifying the completion of log-in (2410).

After the initiator program 509 receives the log-in response, the log-in process is ended (2411).

The path change program 1701-2 executes a data copy process (2412). The data copy process will be described in detail later by referring to FIG. 26.

The path change program 1701-2 deletes the internal LU 1203 being a copy source, and forwards a request to the path charge program 1701-1 for updating the LU management table 121 (2413).

Upon reception of the request for updating the LU management table 121, the path change program 1701-1 updates the LU management table 121 (2414). To be specific, the information about the internal LU 1203 being a copy source stored in the LU management table 121 is deleted from the LU management table 121. The path change program 1701-1 also stores information about the newly-created internal LU 1203 being a copy destination in the LU management table 121.

With such a process, the internal LU 1203 with a high-load node is copied into the internal LU 1203 with a low-load node, i.e., data copy process 2701, and a target address change process 2700 can be executed to the internal LU 1203 with a high-load node.

FIG. 25 is a diagram illustrating an example of the copy-state management table 1704 in the second embodiment of the invention.

The copy-state management table 1704 includes elements of. "copy area 2500" and "copy state 2501".

The element of "copy area 2500" indicates the address range of each of areas being the results of partitioning the storage area of the internal LU 1203 into the areas of a predetermined size. For example, the value "0000-0009" of the copy area indicates the storage area with the address of 0000-00009 of the internal LU 1203. The path change program 1701-2 manages the copy process in the unit of a copy area.

The element of "copy state 2501" manages the copy state of data stored in each of the values in the element of "copy area 2500". To be specific, when copying is completed, stored is "copied", and when copying is not yet completed, stored is "not copied".

The copy-state management table 1704 is created by the path change program 1701 before the data copy process 2701.

Figure 26:
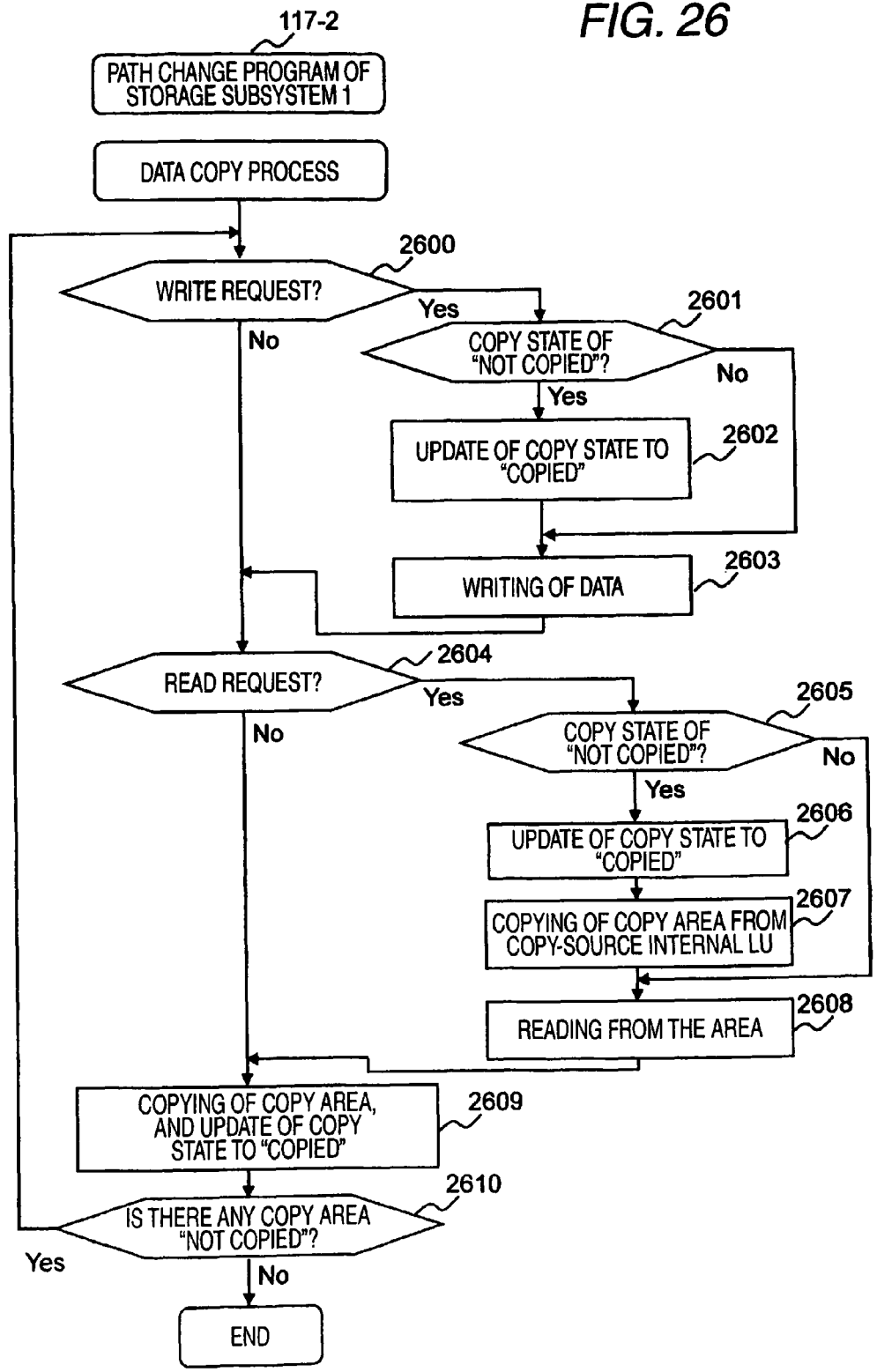
FIG. 26 is a flowchart of a data copy process in the second embodiment of the invention.

FIG. 26 is a flowchart of the data copy process 2701 in the second embodiment of the invention.

In the data copy process 2701, the path change program 1701-2 being a copy destination reads data from the iSCSI target corresponding to the internal LUN 301 being a copy source, and writes the data being the reading result to the internal LU 1203 being a copy destination.

Assumed below is that the path change program 1701-2 forwards, before the data copy process 2701, to the initiator program 1702-2, the information about the copy source provided in step 2404, i.e., the values of the "target name 302", the "IP address 303", and the "port number 304", and the initiator program 1702-2 is logged in the iSCSI target of the internal LU 1203 being a copy source.

The path change program 1701-2 then determines whether or not a write request is issued from the host 100 to the internal LU 1203 being a copy destination (2600).

When the determination result is positive, i.e., a write request is issued from the host 100 to the internal LU 1203 being a copy destination, the path change program 1701-2 specifies any of the values in the element of "copy area 2500" corresponding to the address found in the write request, and then determines whether or not the element of "copy-state 2501" of thus specified value of the "copy area 2500" is showing "not copied" (2601).

When the determination result tells that the element of "copy state 2501" for the specified value of the "copy area 2500" is not showing "not copied", the procedure goes to step 2603.

On the other hand, when the determination result tells that the element of "copy state 2501" for the specified value of the "copy area 2500" is showing "not copied", the path change program 1701-2 updates the element of "copy state 2501" for the specified value of the "copy area 2500" to "copied" (2602).

The path change program 1701-2 then writes the data stored in the internal LU 1203 being a copy source to the internal LU 1203 being a destination (2603), and the procedure goes to step 2604.

In step 2600, when the determination result tells that a write request is issued from the host 100 to the internal LU 1203 being a copy destination, or when the process of step 2603 is completed, the path change program 1701-2 determines whether a read request is issued from the host 100 to the internal LU 1203 being a copy destination (2604).

When the determination result tells that a read request is issued from the host 100 to the internal LU 1203 being a copy destination, the path change program 1701-2 specifies any of the values in the element of "copy area 2500" corresponding to the address found in the read request, and then determines whether or not the element of "copy state 2500" of thus specified value of the "copy area 2500" is showing "not copied" (2605).

When the determination result tells that the element of "copy state 2501" for the specified value of the "copy area 2500" is not showing "not copied", the procedure goes to step 2608.

On the other hand, when the determination result tells that the element of "copy state 2501" for the specified value of the "copy area 2500" is showing "not copied", the path change program 1701-2 updates the element of "copy state 2501" of the specified value of the "copy area 2500" to "copied" (2606).

The path change program 1701-2 then reads the value of the "copy area 2500" including the address of a read target from the internal LU 1203 being a copy source, and writes the value of the "copy area 2500" being the reading result to the internal LU 1203 being a copy destination (2607).

The path change program 1701-2 reads the data from the address of the read target, and makes a response to the host 100 (2608).

In step 2604, when the determination result tells that a read request is not issued from the host 100 to the internal LU 1203 being a copy destination, or when the process of step 2607 is completed, the path change program 1701-2 copies the element of "copy area 2005" in the ascending address order of address, and updates the element of "copy state 2501" for the element of "copy area 2005" to "copied" (2609).

The path change program 1701-1 then refers to the element of "copy state 2501" of the copy-state management table 1704, and determines whether or not there is any indication of "not copied" in the element of "copy state 2501" for the element of "copy area 2500" (2610).

When the determination result tells that there is the indication of "not copied" in the element of "copy state 2501" for the element of "copy area 2500", the procedure returns to step 2600, and the path change program 1701-1 executes the above-described process similarly.

When the determination result tells that there is no indication of "not copied" in the element of "copy state 2501" for the element of "copy area 2500", this is the end of the process.

With such a process, the I/O load with respect to the internal LUs 1203 can be shared among the storage subsystems 106. Moreover, a path change can be made in such a manner that the host 100 can directly access the storage subsystem 106 storing the data moved as a result of the I/O load sharing process.

Exemplified in the second embodiment of the invention is the case of sharing the I/O load, but alternatively, any of the internal LUs 1203 showing "0" in the element of "IOPS 1800" can be all put into one RAID group 1202. With the resulting RAID group 1202, until an I/O request is issued by the host 100 to the internal LUs 1203 in the RAID group 1202, every disk 115 configuring the RAID group 1202 can remain turned OFF or remain on standby. This favorably achieves power saving of the storage subsystem 106.

To be specific, the storage subsystem 106 manages, using the RAID group management table 1706 (refer to FIG. 28), the capacity and the capacity in use on the RAID group 1202 basis.

Although not shown, the storage subsystem 106 also manages, using the LU management table 121, the capacity for each of the internal LUs 1203.

FIG. 28 is a diagram illustrating an example of the RAID group management table 1706 in the second embodiment of the invention.

The RAID group management table 1706 includes the element of "RAID group ID 300", and elements of "capacity 2800" and "capacity in use 2801".

The element of "capacity 2800" stores the total value of the capacities of each of the RAID groups 1202 corresponding to the value in the element of "RAID group ID 300".

The element of "capacity in use 2801" stores the value of capacity allocated for use as the value in the element of "internal LU 1203" in each of the RAID groups 1202 corresponding to the value in the element of "RAID group ID 300".

The path change program 1701 acquires information about the load management table 1703 from any other storage subsystem 106 registered in the system group management table 1705.

Using the load information acquired as such, from the internal LUs 1203 in any of the RAID groups 1202 not showing "0" in the element of "IOPS 1800", the path change program 1701 specifies any internal LU 1203 showing "0" in the element of "IOPS 1800".

The path change program reallocates the internal LUs 1203 in such a manner that the RAID group 1202 includes only the specified internal LU(s) 1203. When the internal LU 1203 specified in the not-in-use area of the RAID group 1202 showing "0" in the element of "IOPS 1800" can be moved, the internal LU 1203 may be accordingly moved.

At the time of determining the RAID group 1202 being a destination for the specified internal LU(s) 1203, alternatively, for reducing the frequency of data movement, selected, with a first priority, may be the RAID group showing the smallest value for the capacity in use of the internal LU 1203 not with "0" in the element of "IOPS 1800", for example.

The process of moving the internal LUs 1203 is executed similarly to the path change process of FIG. 24. After completion of reallocation of the internal LUs 1203, the disks 115 configuring the RAID group configured only by the internal LUs 1203 showing "0" in the element of "IOPS 1800" are turned OFF or put on standby, thereby being able to achieve power saving of the storage subsystem 106. When an I/O request is issued by the host 100 to the internal LUs 1203 configuring the RAID group 1202, the storage subsystem 106 turns ON the disks or resumes the disks from standby, and then processes the I/O request.

In the second embodiment of the invention, by increasing the number of the C-LUs 1201 configuring the LVM-LU 1200, the internal LUs 1203 can be reduced in size. The data for movement is thus reduced so that the time to be taken to move the data can be favorably reduced.

As described above, in the second embodiment of the invention, in the unit of the internal LU 1203 whose storage area is smaller than that of the LVM-LU 1200 being an access target by the application program 507, when the I/O load is increased in any specific storage subsystem in a computer system connected with a plurality of storage subsystems 106, data movement and path change can be both executed to any of the storage subsystems 106 with the low level of I/O load. This thus favorably leads to the effects of being able to provide a computer system with a high level of extendibility of not reducing the I/O performance at the limit at the time of load sharing compared with before the load sharing.

In the second embodiment of the invention, exemplified are the method of load sharing among the storage subsystem 106 and the computer system. Alternatively, load sharing can be performed with respect to the values of the "IOPS 1800" between the RAID groups 1202 in the storage subsystem 106.

Moreover, in the second embodiment of the invention, exemplified is the case of performing data movement over the storage network 103. As alternatives to the storage network 103 and the management network 105, a data-movement network connecting together the storage subsystems may be used for data movement. If this is the configuration, the band in use of the storage network 103 can be reduced, thereby being able to suppress any possible reduction of the I/O performance of the host due to the influence of data movement.

Described in the first and second embodiments of the invention is the case with iSCSI, however, using an FC (Fibre Channel) is also possible for similar load sharing. If this is the case, the storage network 103 is an SAN (Storage Area Network) including a fibre channel switch. As an alternative to the host I/F 108, the storage subsystem 106 may be provided with an HBA (Host Bus Adaptor), and is connected from the HBA to the SAN.

With the network using the FC, the load monitoring is performed to the HBA of the storage subsystem 106, and the fibre channel switch. When some load occurs to the HBA of the storage subsystem 106, a path change is made to any other HBA, and when some load occurs to the fiber channel switch, a path change is similarly made to the fibre channel switch. As such, the effects similar to those of the first and second embodiments can be favorably achieved.

What is claimed is:

1. A load sharing method in a computer system including a storage subsystem, a host computer to be connected to the storage subsystem, a management computer to be connected to the storage subsystem, and a plurality of communication paths and, in the computer system, the host computer including a first interface to be connected to a network, a first processor to be connected to the first interface, and a first memory to be connected to the first processor, the management computer including a second interface to be connected to another network, a second processor to be connected to the second interface, and a second memory to be connected to the second processor, the storage subsystem including a controller that performs control over data reading and writing from/to a plurality of disk drives, the controller including a plurality of host interfaces to be connected to the host computer, a disk interface to be connected to the disk drives, a third processor to be connected to the plurality of host interfaces and the disk interface, and a third memory to be connected to the third processor, the storage subsystem configuring a disk drive group from the plurality of disk drives and creating a plurality of logical units from a storage area of the disk drive group, the host computer creating a logical storage area to be configured by a plurality of virtual logical units respectively corresponding to the plurality of logical units, the plurality of communications paths being respectively set between the host computer and the plurality of logical units configuring the logical storage area, each of the communication paths corresponding to one of the plurality of host interfaces, and the host computer accessing, through access to the virtual logical units, the plurality of logical units over the communications paths, the load sharing method comprising:

monitoring, by the storage subsystem, a band of use of each of the plurality of host interfaces in the storage subsystem and a band of use of each of the plurality of logical units;

detecting, based on a result of monitoring the band of use of each of the plurality of host interfaces, a first host interface having a largest band use value among the host interfaces and a second host interface having a smallest band use value among the host interfaces upon any imbalance occurring between the plurality of host interfaces;

detecting, based on a result of monitoring the band of use of each of the plurality of logical units, a specific logical unit having a band use value that is closest to half of a difference between the band use value of the first host interface and the band use value of second host interface among each of the plurality of logical units for which the respective communication path corresponds to the first host interface; and changing, by the storage subsystem, the communications path between the specific logical unit and the host computer from corresponding to the first host interface to corresponding to the second host interface.

2. The load sharing method according to claim 1, further comprising:

transmitting, by the storage subsystem, a request to the host computer for changing the communications paths;

transmitting, to the storage subsystem, by the host computer, when the request for changing the communications paths is received, based on the received request, a request for disconnecting the connection via the first host interface; and transmitting, to the storage subsystem, by the host computer, after a response is received from the storage subsystem about the request for disconnecting the connection, a request for establishing a connection via the second host interface.

3. The load sharing method according to claim 1, further comprising:

disconnecting, by the storage subsystem, each of the communications paths corresponding to the first host interface;

transmitting, to the storage subsystem, by the host computer, when the disconnection is detected, a request for reestablishing a connection to the specific logical unit;

transmitting, to the host computer, by the storage subsystem, when the request for reestablishing the connection is received, a response including change information about the communications paths; and transmitting, to the storage subsystem, by the host computer, based on the change information about the communications paths included in the received response, a request for establishing a connection to the specific logical unit via the second host interface.

4. A computer system, comprising:

a storage subsystem to be connected to a host computer, the host computer including a first interface to be connected to a network, a first processor to be connected to the first interface, and a first memory to be connected to the first processor;

a management computer to be connected to the storage subsystem, the management computer including a second interface to be connected to another network, a second processor to be connected to the second interface, and a second memory to be connected to the second processor, and wherein the storage subsystem includes a controller that performs control over data reading and writing from/to a plurality of disk drives, and the controller includes a plurality of host interfaces to be connected to the host computer, a disk interface to be connected to the disk drives, a third processor to be connected to the plurality of host interfaces and the disk interface, and a third memory to be connected to the third processor, wherein the storage subsystem configures a disk drive group from the plurality of disk drives and creates a plurality of logical units from a storage area of the disk drive group, wherein the host computer creates a logical storage area configured from a plurality of virtual logical units respectively corresponding to the plurality of logical units, wherein a plurality of communications paths are respectively set between the host computer and the plurality of logical units configuring the logical storage area, and each of the communication paths corresponds to one of the plurality of host interfaces, wherein the host computer accesses, through access to the virtual logical units, the plurality of logical units over the communications paths, and wherein the storage subsystem monitors a band of use of each of the plurality of host interfaces in the storage subsystem and a band of use of each of the plurality of logical units;

detects, based on a result of monitoring the band of use of each of the plurality of host interfaces, a first host interface having a largest band use value among the host interfaces and a second host interface having a smallest band use value among the host interfaces upon any imbalance occurring between the plurality of host interfaces;

detects, based on a result of monitoring the band of use of each of the plurality of logical units, a specific logical unit having a band use value that is closest to half of a difference between the band use value of the first host interface and the band use value of second host interface among each of the plurality of logical units for which the respective communication path corresponds to the first host interface; and changes the communications path between the specific logical unit and the host computer from corresponding to the first host interface to corresponding to the second host interface.

5. The computer system according to claim 4, wherein the storage subsystem also transmits a request to the host computer for changing the communications paths, and the host computer transmits, to the storage subsystem, when receiving the request for changing the communications paths, based on the received request, a request for disconnecting the connection via the first host interface, and transmits, to the storage subsystem, after receiving a response from the storage subsystem about the request for disconnecting the connection, a request for establishing a connection via the second host interface.

6. The computer system according to claim 4, wherein the storage subsystem also disconnects the communications paths corresponding to the first host interface, the host computer transmits, to the storage subsystem, when detecting the disconnection, a request for reestablishing a connection to the specific logical unit, the storage subsystem transmits, to the host computer, when receiving the request for reestablishing the connection, a response including change information about the communications paths, and the host computer transmits, to the storage subsystem, based on the change information about the communications paths included in the response, a request for establishing a connection to the specific logical unit via the second host interface.

* * * * *